(12) United States Patent
Kitazato

(10) Patent No.: US 10,356,473 B2
(45) Date of Patent: Jul. 16, 2019

(54) RECEPTION DEVICE, RECEPTION METHOD, PROGRAM, AND INFORMATION PROCESSING SYSTEM

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/344,188

(22) PCT Filed: Oct. 18, 2012

(86) PCT No.: PCT/JP2012/076884
§ 371 (c)(1),
(2) Date: Mar. 11, 2014

(87) PCT Pub. No.: WO2013/061851
PCT Pub. Date: May 2, 2013

(65) Prior Publication Data
US 2014/0337874 A1  Nov. 13, 2014

(30) Foreign Application Priority Data
Oct. 26, 2011 (JP) ................................ 2011-234555

(51) Int. Cl.
*H04N 21/462* (2011.01)
*H04N 21/472* (2011.01)
(Continued)

(52) U.S. Cl.
CPC ......... *H04N 21/462* (2013.01); *H04N 21/438* (2013.01); *H04N 21/44213* (2013.01);
(Continued)

(58) Field of Classification Search
CPC ....... H04N 21/44008; H04N 21/23418; H04N 21/4722; H04N 21/8133; H04N 21/2668; H04N 21/812
(Continued)

(56) References Cited

U.S. PATENT DOCUMENTS 6,263,505 B1 * 7/2001 Walker et al. ................. 725/110
8,234,673 B2 * 7/2012 Kinoshita et al. .............. 725/51
(Continued)

FOREIGN PATENT DOCUMENTS

EP         1 705 908 A2    9/2006
JP         2002-209204 A   7/2002
(Continued)

OTHER PUBLICATIONS

U.S. Appl. No. 14/241,759, filed Feb. 27, 2014, Kitazato.
(Continued)

*Primary Examiner* — Hsiungfei Peng
(74) *Attorney, Agent, or Firm* — Oblon, McClelland, Maier & Neustadt, L.L.P.

(57) ABSTRACT

Provided is a reception device including a reception part configured to receive first content, a feature amount extraction part configured to extract a feature amount from data of the received first content, an identification result acquisition part configured to acquire an identification result for the first content identified using the extracted feature amount, a command acquisition part configured to acquire a command for controlling an operation of changing over between the first content and second content different from the first content depending on the acquired identification result, and a control part configured to control an operation of changing over from the first content to the second content in response to the acquired command.

26 Claims, 19 Drawing Sheets

(51) Int. Cl.
  *H04N 21/442* (2011.01)
  *H04N 21/438* (2011.01)
  *H04N 21/8358* (2011.01)
  *H04H 20/10* (2008.01)
  *H04H 60/37* (2008.01)

(52) U.S. Cl.
  CPC ..... *H04N 21/472* (2013.01); *H04N 21/47202* (2013.01); *H04N 21/8358* (2013.01); *H04H 20/106* (2013.01); *H04H 60/375* (2013.01); *H04H 2201/40* (2013.01); *H04H 2201/90* (2013.01)

(58) Field of Classification Search
  USPC ...... 725/32, 34–35, 109, 110, 112, 113, 115, 725/116, 136
  See application file for complete search history.

(56) References Cited

U.S. PATENT DOCUMENTS

| | | | | |
|---|---|---|---|---|
| 8,660,267 | B2* | 2/2014 | Oostveen | H04N 19/467 380/204 |
| 8,869,231 | B2* | 10/2014 | Ito | 725/136 |
| 2003/0051252 | A1* | 3/2003 | Miyaoku | H04N 7/17318 725/109 |
| 2005/0257067 | A1* | 11/2005 | Roberts | G06T 1/0035 713/186 |
| 2007/0079329 | A1* | 4/2007 | Aoyagi | H04N 7/17318 725/37 |
| 2009/0113469 | A1* | 4/2009 | Jo et al. | 725/32 |
| 2010/0229201 | A1* | 9/2010 | Choi et al. | 725/54 |
| 2010/0269128 | A1* | 10/2010 | Gordon | H04N 7/17318 725/25 |
| 2011/0063411 | A1 | 3/2011 | Kitazato | |
| 2012/0016876 | A1 | 1/2012 | Oostveen et al. | |
| 2013/0198768 | A1 | 8/2013 | Kitazato | |
| 2013/0212634 | A1 | 8/2013 | Kitazato | |
| 2013/0215327 | A1 | 8/2013 | Kitazato et al. | |
| 2014/0067922 | A1 | 3/2014 | Yamagishi et al. | |

FOREIGN PATENT DOCUMENTS

| | | |
|---|---|---|
| JP | 2006-245653 A | 9/2006 |
| JP | 2011-066597 A | 3/2011 |
| KR | 10-2005-0049563 A | 5/2005 |
| WO | WO 2004/080073 A2 | 9/2004 |
| WO | WO 2005/006758 A1 | 1/2005 |
| WO | WO 2011/069035 A1 | 6/2011 |

OTHER PUBLICATIONS

International Search Report dated Jan. 22, 2013 in PCT/JP2012/076884.
Office Action dated May 26, 2016 in Japanese Patent Application No. 2011-234555.
European Office Action dated Feb. 18, 2016 in European Patent Application No. 12843610.2.
Notice of Grant dated Dec. 6, 2016 in Japanese Patent Application No. 2011-234555.
Japanese Office Action dated Oct. 20, 2015 in Japanese Patent Application No. 2011-234555.
Office Action dated Sep. 10, 2018 in Korean Patent Application No. 10-2014-7010305, 11 pages (with English language translation).

* cited by examiner

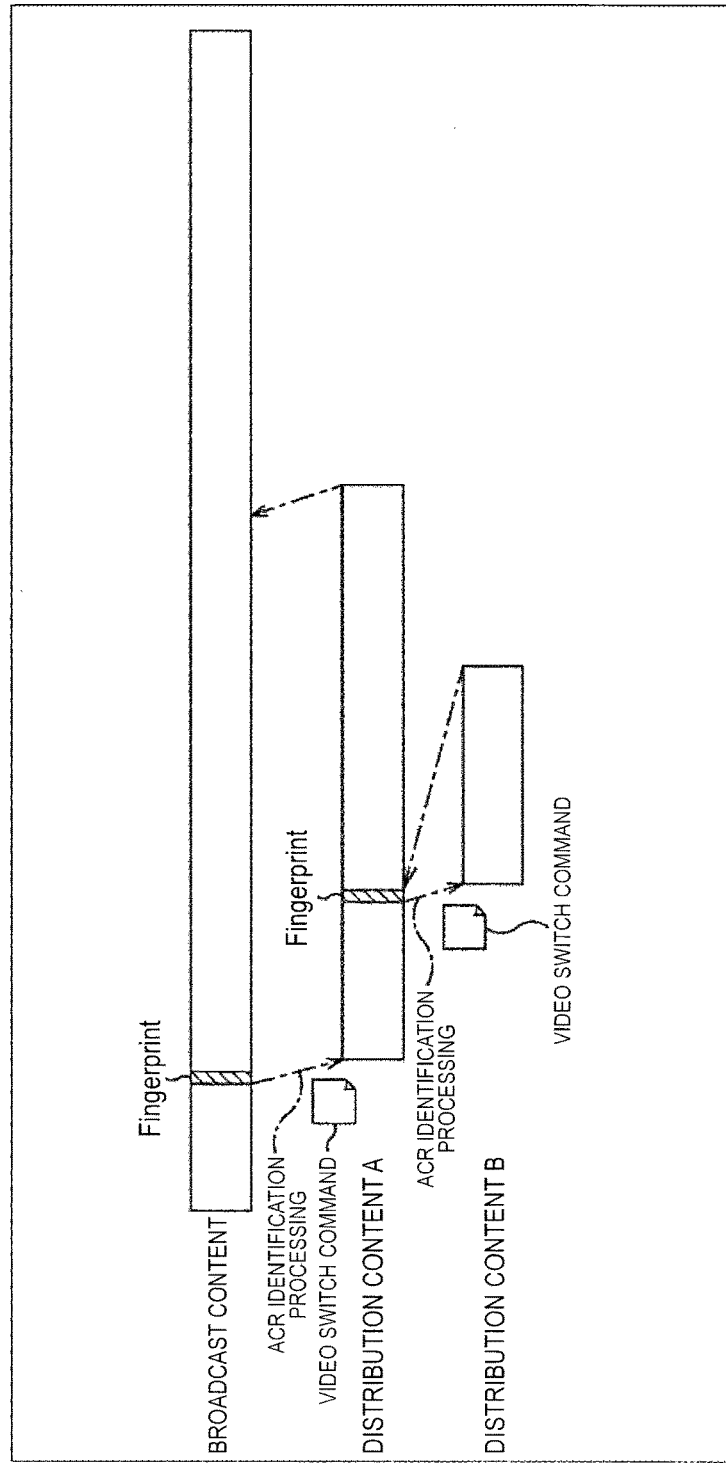

FIG. 6
Switch Command

| ITEM | EXPLANATION |
|---|---|
| Switch ID | ID FOR IDENTIFYING STREAM CHANGE-OVER |
| Command Code | CODE NUMBER INDICATING Switch |
| Switching Time | STREAM CHANGE-OVER TIME |
| Target Media Type | STREAM TYPE OF CHANGE-OVER DESTINATION<br>0: Broadcast, 1: VOD/MP4,<br>2 VOD/MPEG2_TS, 3:VOD/AVC_TS |
| Target Stream URL | DESTINATION URL FOR ACQUISITION OF STREAM OF CHANGE-OVER DESTINATION |
| Stream Start Position | REPRODUCTION START TIME POSITION OF STREAM OF CHANGE-OVER DESTINATION |
| Retention Mode | 0: Pass-Through Mode  1: Retention Mode |
| Personalized Mode | 0: Not Personalized (fixed stream), 1: DeviceID Based,<br>2: Password Based |
| Auto Switch Flag | 0: Manual Switch, 1: Auto Switch |
| Switching Message | QUESTION SENTENCE FOR STREAM SELECTION IN CASE OF Manual Switching |
| Return Flag | 0: Non-Return, 1: Return |

FIG. 7
Preload Command

| ITEM | EXPLANATION |
|---|---|
| Switch ID | ID FOR IDENTIFYING STREAM CHANGE-OVER |
| Command Code | CODE NUMBER INDICATING Preload |
| Target Media Type | STREAM TYPE OF CHANGE-OVER DESTINATION<br>0: Broadcast, 1:VOD/MP4,<br>2 VOD/MPEG2_TS, 3:VOD/AVC_TS |
| Target Stream URL | DESTINATION URL FOR ACQUISITION OF STREAM OF CHANGE-OVER DESTINATION |
| Stream Start Position | REPRODUCTION START TIME POSITION OF STREAM OF CHANGE-OVER DESTINATION |
| Loop Back Mode | 0: Non-Loop-Back Mode, 1: Loop-Back Mode |
| Personalized Mode | 0: Not Personalized (fixed stream), 1: DeviceID Based,<br>2: Password Based |
| Time to Switch | ESTIMATED TIME PERIOD UNTIL STREAM CHANGE-OVER |

FIG. 8
Preselect Command

| ITEM | EXPLANATION |
|---|---|
| Switch ID | ID FOR IDENTIFYING STREAM CHANGE-OVER |
| Command Code | CODE NUMBER INDICATING Preselect |
| Switching Message | QUESTION SENTENCE FOR STREAM SELECTION |
| Time to Switch | ESTIMATED TIME PERIOD UNTIL STREAM CHANGE-OVER |

FIG. 9
Enable Switch Command

| ITEM | EXPLANATION |
|---|---|
| Switch ID | ID FOR IDENTIFYING STREAM CHANGE-OVER |
| Command Code | CODE NUMBER INDICATING Enable Switch |
| Switching Meta URL | DESTINATION FOR ACQUISITION OF VRT |

FIG. 10
Disable Switch Command

| ITEM | EXPLANATION |
|---|---|
| Switch ID | ID FOR IDENTIFYING STREAM CHANGE-OVER |
| Command Code | CODE NUMBER INDICATING Disable Switch |

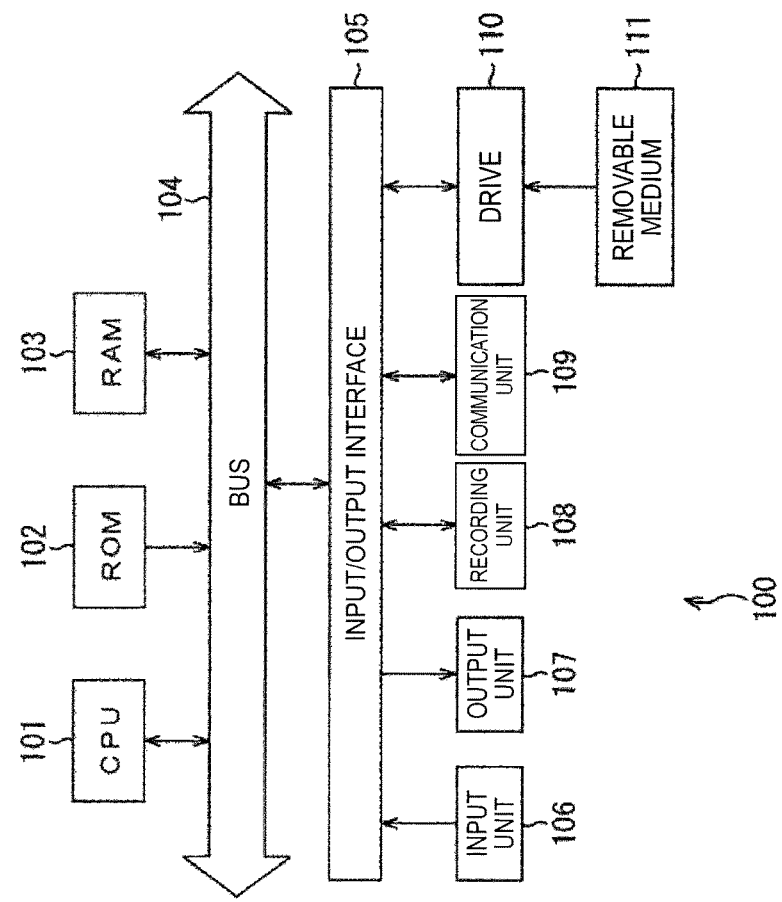

RECEPTION DEVICE, RECEPTION METHOD, PROGRAM, AND INFORMATION PROCESSING SYSTEM

TECHNICAL FIELD

The present technology relates to a reception device, a reception method, a program, and an information processing system, and particularly relates to a reception device capable of changing over content using a content identification technique, a reception method, a program, and an information processing system.

BACKGROUND ART

It is expected that in a reception device for digital television broadcast represented by a digital television receiver, a service will be widespread whereby to acquire and execute an application program to be executed in association with broadcast content such as a program and CM from an application server connected to the Internet. For this reason, a technology for attaining such a hybrid service as a fusion of broadcast and communication has been discussed (e.g., refer to Patent Literature 1).

In addition, some reception devices like this have a VOD (video on demand) function to allow distribution content to be acquired from a distribution server at any time via the Internet and reproduced.

CITATION LIST

Patent Literature

Patent Literature 1: JP 2006-245653A

SUMMARY OF INVENTION

Technical Problem

On the other hand, a technology for identifying the content referred to as ACR (Automatic Content Recognition) has been known. The ACR technology carries out content identification by collating a feature amount extracted from a video signal and audio signal of the content which is to be identified with a database having registered therein feature amounts extracted in advance from video signals and audio signals of many pieces of content.

The hybrid service of broadcast and communication would be able to be provided by identifying the content using the ACR technology and further providing the application program which is executed in association with the identified content.

On the other hand, a case may be assumed where broadcast content broadcasted via a broadcast network and distribution content distributed via a communication network are changed over from each other at a predetermined timing for the purpose of changing over from a program to a CM or the like, for example. In a case of performing such a change-over process using the ACR technology, in response to an identification result for content the changing-over is performed to the other content, where the change-over of that content is required to be quickly carried out.

However, a technical scheme is currently not established for performing a content changing-over process using the ACR technology.

The present technology is provided in consideration of such a circumstance to allow the content to be changed over using the content identification technique.

Solution to Problem

According to the first aspect of the present technology, there is provided a reception device including a reception part configured to receive first content, a feature amount extraction part configured to extract a feature amount from data of the received first content, an identification result acquisition part configured to acquire an identification result for the first content identified using the extracted feature amount, a command acquisition part configured to acquire a command for controlling an operation of changing over between the first content and second content different from the first content depending on the acquired identification result, and a control part configured to control an operation of changing over from the first content to the second content in response to the acquired command.

The command is a first command for requesting a user to confirm whether or not a change-over is required to be carried out, prior to a timing of change-over from the first content to the second content, or a second command for changing over from the first content to the second content. The control part requests the user to confirm whether or not the change-over is required to be carried out, in response to the first command. In a case where the user permits the change-over to be carried out, the control part changes over from the first content to the second content in response to the second command.

The command is the first command, the second command, or a third command for causing the second content to be acquired prior to a timing of change-over from the first content to the second content. In a case where the user permits the change-over to be carried out, the control part acquires the second content in response to the third command prior to a timing of change-over. The control part changes over from the first content to the acquired second content in response to the second command.

The second command includes time information indicating a time to execute the second command. The control part changes over from the first content to the second content when a timing of change-over arrives in accordance with the time information included in the second command.

The second command or the third command is settable for each user.

The command is a fourth command for setting a state in which it is possible to change to the second content that corresponds to a viewpoint designated by the user, or a fifth command for ending the state in which it is possible to change to the second content that corresponds to the viewpoint designated by the user. The control part sets the state in which it is possible to change to the second content that corresponds to the viewpoint designated by the user in response to the fourth command. The control part ends the state in which it is possible to change to the second content that corresponds to the viewpoint designated by the user in response to the fifth command.

The reception device further includes a buffer configured to sequentially store data of the received first content when the first content is changed over to the second content, and an output part configured to output the first content stored in the buffer while the second content is being output, when the second content is changed over to the first content.

The reception device further includes an output part configured to output the received first content when the second content is changed over to the first content.

The identification result acquisition part acquires the identification result for the first content identified using an ACR (Automatic Content Recognition) technology from the extracted feature amount.

The first content is broadcast content broadcasted via a broadcast network. The second content is distribution content distributed from a distribution server via a communication network.

The feature amount extraction part extracts the feature amount from any one or both of a video signal and an audio signal of the first content.

The reception device may be an independent device or an internal block constituting one device.

A reception method or program according to the first aspect of the present technology is a reception method or program which corresponds to the reception device according to the first aspect of the present technology described above.

In the reception device, reception method, and program according to the first aspect of the present technology, first content is received, a feature amount is extracted from data of the received first content, an identification result for the first content identified using the extracted feature amount is acquired, a command is acquired for controlling an operation of changing over between the first content and the second content different from the first content depending on the acquired identification result, and the first content is changed over to the second content depending on the acquired command.

According to the second aspect of the present technology, there is provide an information processing system including a reception device, a first information processing device, a second information processing device, and a third information processing device. The reception device includes a reception part configured to receive a first content, a feature amount extraction part configured to extract a feature amount from data of the received first content, an identification result acquisition part configured to transmit the extracted feature amount to the first information processing device, and to acquire an identification result for the first content which is identified using the feature amount in the first information processing device, a command acquisition part configured to transmit the identification result acquired from the first information processing device to the second information processing device, and to acquire from the second information processing device a command for controlling an operation of changing over between the first content and second content distributed from the third information processing device, and a control part configured to control an operation of changing over from the first content to the second content distributed from the third information processing device in response to the command acquired from the second information processing device. The first information processing device includes a first provision part configured to provide the identification result obtained by identifying the first content using the feature amount in response to an inquiry from the reception device. The second information processing device includes a second provision part configured to provide the command corresponding to the identification result in response to an inquiry from the reception device. The third information processing device includes a distribution part configured to distribute the second content in response to an inquiry from the reception device.

In the information processing system according to the second aspect of the present technology, the reception device receives the first content, the feature amount is extracted from the received first content, the extracted feature amount is transmitted to the first information processing device, the identification result is acquired which is for the first content identified using the feature amount in the first information processing device, the identification result acquired from the first information processing device is transmitted to the second information processing device, the command is acquired from the second information processing device for controlling the operation of changing over between the first content and the second content distributed from the third information processing device, depending on the command acquired from the second information processing device, controlled is the operation of changing over from the first content to the second content distributed from the third information processing device, the first information processing device provides in response to the inquiry from the reception device the identification result acquired by identifying the first content using the feature amount, the second information processing device provides in response to the inquiry from the reception device the command corresponding to the identification result, and the third information processing device distributes in response to the inquiry from the reception device the second content.

Advantageous Effects of Invention

According to the first aspect and second aspect of the present technology, the content can be changed over using the content identification technique.

BRIEF DESCRIPTION OF DRAWINGS

FIG. 5 is a diagram for explaining a transmission timing of a video switch command.

FIG. 6 is a diagram illustrating elements of a switch command.

FIG. 7 is a diagram illustrating elements of a preload command.

FIG. 8 is a diagram illustrating elements of a preselect command.

FIG. 9 is a diagram illustrating elements of an enable switch command.

FIG. 10 is a diagram illustrating elements of a disable switch command.

FIG. 21 is a diagram illustrating a configuration example of a computer.

DESCRIPTION OF EMBODIMENTS

Hereinafter an explanation will be given of embodiments of the present technology with reference to the drawings.

Configuration Example of Broadcast System

Figure 1:
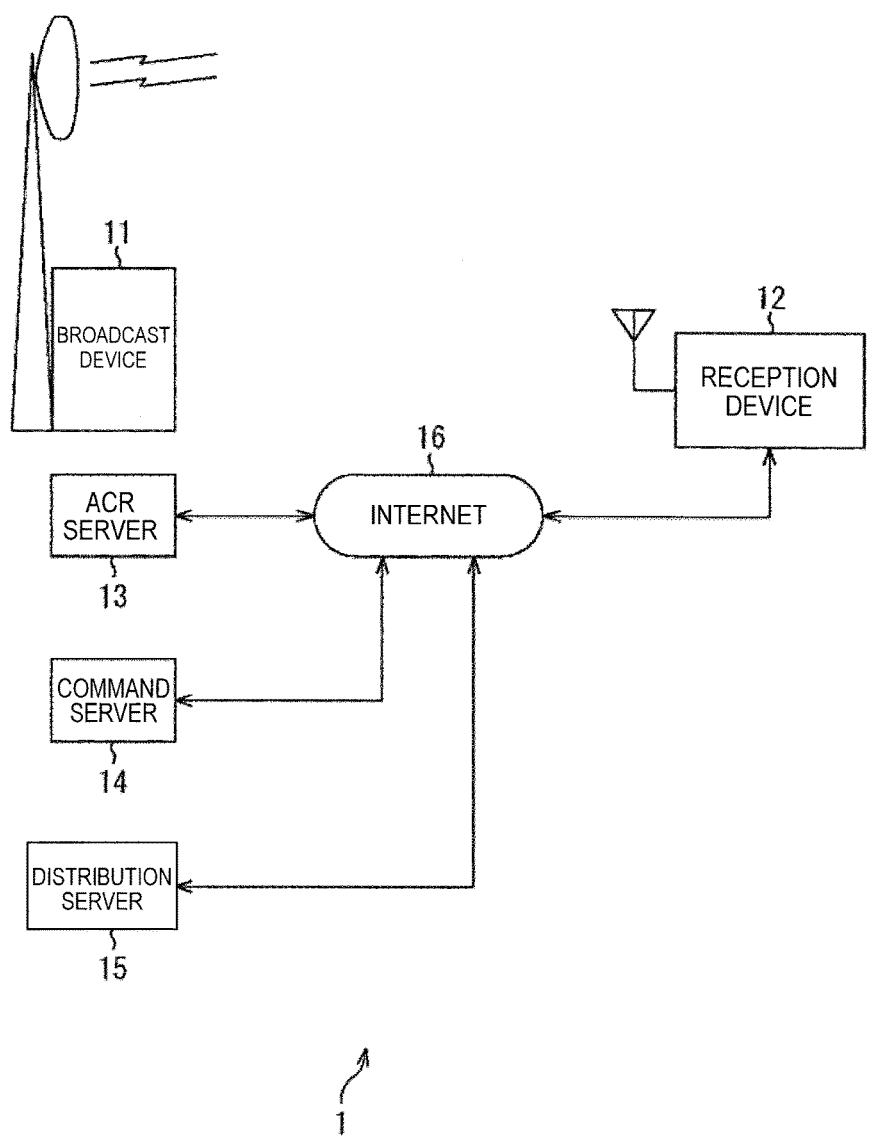
FIG. 1 is a diagram illustrating a configuration example of a broadcast system.

FIG. 1 illustrates a broadcast system 1 of this embodiment. This broadcast system 1 is configured to include a broadcast device 11, reception device 12, ACR server 13, command server 14, and distribution server 15. The broadcast system 1 is an example of an information processing system. In addition, the reception device 12, ACR server 13, command server 14, and distribution server 15 are coupled with each other via the Internet 16.

The broadcast device 11 is configured to transmit (broadcast) a digital television broadcast signal of broadcast content corresponding to a digital television program, CM or the like.

The reception device 12 receives the digital television broadcast signal transmitted from the broadcast device 11 to acquire video and audio of the broadcast content. The reception device 12 outputs the acquired video and audio to a display (display 21 in FIG. 2) and a speaker (speaker 22 in FIG. 2), respectively.

Note that the reception device 12 may exist as a single device or be built in a digital television receiver, video recorder or the like, for example. Additionally, a detailed configuration of the reception device 12 will be described later with reference to FIG. 2.

Moreover, the reception device 12 periodically accesses the ACR server 13 via the Internet 16 to inquire the identification result for the broadcast content. At that time, a feature amount (hereinafter, also referred to as finger print information) extracted from a video signal and audio signal of the broadcast content is transmitted to the ACR server 13.

The ACR server 13 includes a database having registered therein the feature amount extracted from the video signal and audio signal of any broadcast content. The ACR server 13 identifies the broadcast content using the ACR (Automatic Content Recognition) technology in response to an inquiry from any terminal device coupled with the Internet 16. The ACR server 13 collates the finger print information from the reception device 12 with the database to identify the broadcast content such as the digital television program and transmits the identification result therefor to the reception device 12 via the Internet 16.

The reception device 12 accesses the command server 14 via the Internet 16 depending on the identification result received from the ACR server 13 to acquire a video switch command. Here, the video switch command means a command for controlling an operation of changing over between the broadcast content from the broadcast device 11 and distribution content from the distribution server 15.

The command server 14 manages the video switch command. The command server 14 transmits the video switch command to the reception device 12 via the Internet 16 in response to the inquiry from the reception device 12.

The reception device 12 controls the operation of changing over from the broadcast content to the distribution content in response to the video switch command received from the command server 14. Moreover, the reception device 12 accesses the distribution server 15 via the Internet 16 in response to the video switch command received from the command server 14 to acquire the video and audio of the distribution content. The reception device 12 outputs the acquired video and audio to the display and the speaker, respectively.

The distribution server 15 accumulates and manages one or more pieces of distribution content. The distribution server 15 transmits (distributes) the distribution content to the reception device 12 via the Internet 16 in response to the inquiry from the reception device 12.

The broadcast system 1 is configured as below.

Configuration Example of Reception Device

Figure 2:
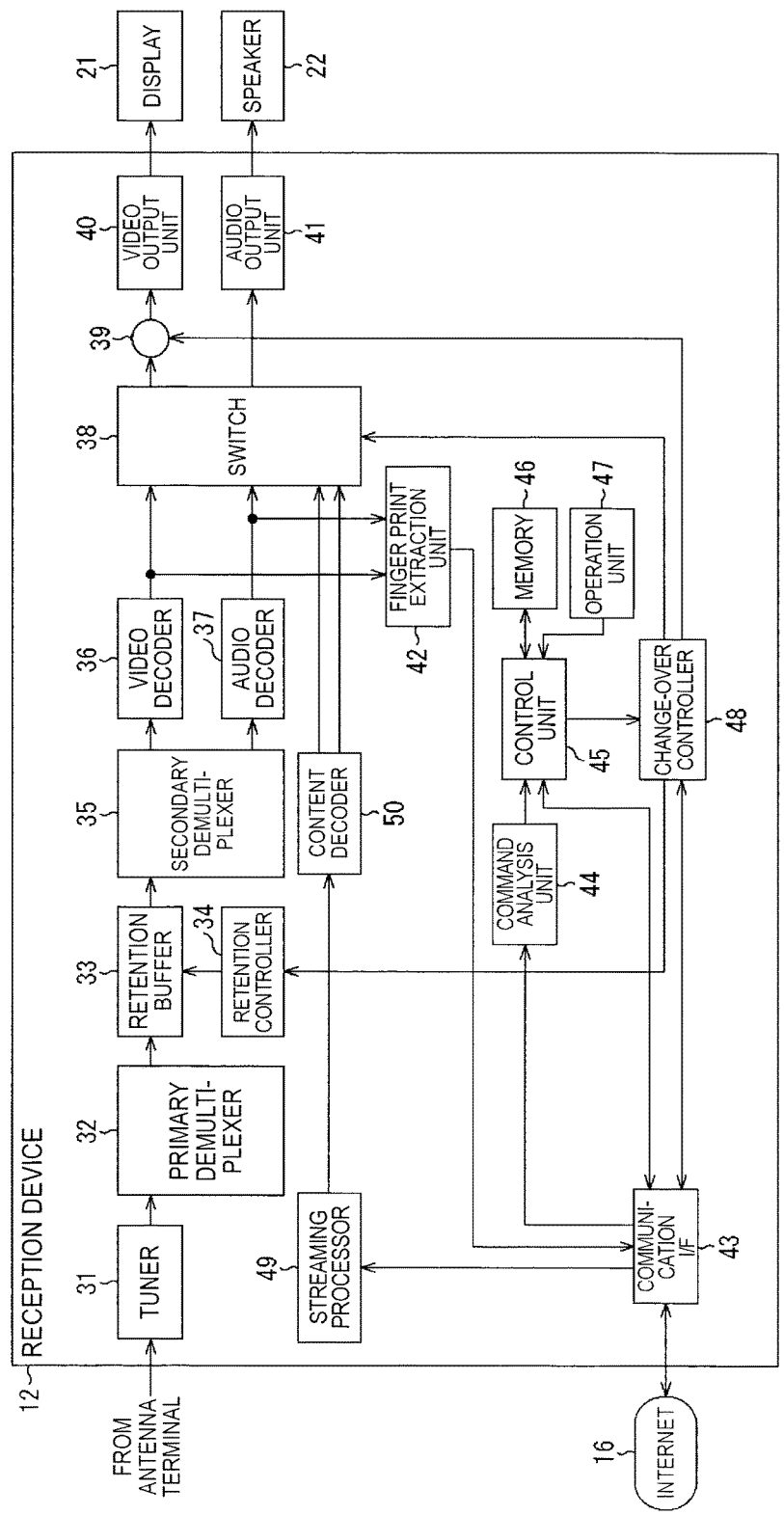
FIG. 2 is a diagram illustrating a configuration example of a reception device.

FIG. 2 is a diagram illustrating a configuration example of the reception device 12 in FIG. 1.

The reception device 12 is configured to include a tuner 31, primary demultiplexer 32, retention buffer 33, retention controller 34, secondary demultiplexer 35, video decoder 36, audio decoder 37, switch 38, synthesis unit 39, video output unit 40, audio output unit 41, finger print extraction unit 42, communication I/F 43, command analysis unit 44, control unit 45, memory 46, operation unit 47, change-over controller 48, streaming processor 49, and content decoder 50.

The tuner 31 receives and demodulates the digital television broadcast signal from the broadcast device 11 to supply a multiplexed stream obtained as a result thereof to the primary demultiplexer 32.

The primary demultiplexer 32 extracts a TS (transport stream) which a user selects from the multiplexed stream supplied by the tuner 31 and supplies to the retention buffer 33.

The retention buffer 33 is constituted by a high-capacity record medium such as a HDD (hard disk drive) or a memory, for example. The retention buffer 33 operates in accordance with control from the retention controller 34 in a pass-through mode or retention mode which is described later.

Specifically, the retention buffer 33, when operating in the retention mode, sequentially stores data of the TS supplied from the primary demultiplexer 32. The TS data stored in the retention buffer 33 is sequentially read out from the retention buffer 33 in accordance with control from the retention controller 34, and supplied to the secondary demultiplexer 35. On the other hand, the retention buffer 33, when operating in the pass-through mode, supplies the TS data from the primary demultiplexer 32 as it is without storing therein to the secondary demultiplexer 35.

The retention controller 34 controls the retention buffer 33 in accordance with control from the change-over controller 48.

The secondary demultiplexer 35 separates the TS supplied from the retention buffer 33 to supply the separated video stream and audio stream to the video decoder 36 and the audio decoder 37, respectively.

The video decoder 36 decodes the video stream from the secondary demultiplexer 35 to supply a video signal obtained as a result thereof to the switch 38 and the finger print extraction unit 42.

The audio decoder 37 decodes the audio stream from the secondary demultiplexer 35 to supply an audio signal obtained as a result thereof to the switch 38 and the finger print extraction unit 42.

The switch 38 is supplied with the video signal from the video decoder 36 and the audio signal from the audio decoder 37 as well as the video signal and audio signal corresponding to the distribution content from the content decoder 50 which is described later.

The switch 38 supplies any one of the video signals which are supplied from the video decoder 36 and content decoder 50 to the synthesis unit 39 in accordance with control from the change-over controller 48. Moreover, the switch 38 supplies any one of the audio signals which are supplied from the audio decoder 37 and content decoder 50 to the audio output unit 41 in accordance with control from the change-over controller 48.

The synthesis unit 39 is supplied with the video signal from the switch 38 and the video signal corresponding to a message regarding content change-over from the change-over controller 48.

The synthesis unit 39 supplies the video signal from the switch 38 to the video output unit 40. In addition, the synthesis unit 39, when supplied with the video signal corresponding to the message from the change-over controller 48, synthesizes the video signal from the change-over controller 48 with the video signal from the switch 38 to supply to the video output unit 40.

The video output unit 40 outputs the video signal supplied from the synthesis unit 39 to the display 21. In addition, the audio output unit 41 outputs the audio signal supplied from the switch 38 to the speaker 22. This allows the video of the broadcast content or distribution content to be displayed on the display 21 and the audio thereof to be output from the speaker 22. Here, the display 21 and the speaker 22 may be configured to be in one unit together with the reception device 12.

The finger print extraction unit 42 is supplied with the video signal from the video decoder 36 and the audio signal from the audio decoder 37. The finger print extraction unit 42 extracts the feature amount from any one or both of the video signal and the audio signal to supply as the finger print information to the communication I/F 43.

The communication I/F 43 transmits the finger print information from the finger print extraction unit 42 via the Internet 16 to the ACR server 13. Moreover, the communication I/F 43 receives the identification result for the broadcast content transmitted from the ACR server 13 to supply to the control unit 45.

The control unit 45 executes a program for control stored in the memory 46 in advance to control the operation of each unit in the reception device 12. The memory 46 is stored in advance with the program for control which is to be executed by the control unit 45. This program for control can be updated on the basis of the digital television broadcast signal or update data acquired via the Internet 16. In addition, the memory 46 stores appropriately various kinds of data from the control unit 45. The operation unit 47 accepts various operations from the user to notify the control unit 45 of operation signals corresponding thereto.

Further, the control unit 45 acquires the identification result from the communication I/F 43. The control unit 45 controls the communication I/F 43 depending on the acquired identification result to access the command server 14 via the Internet 16 and inquire for the video switch command. The communication I/F 43 receives the video switch command transmitted from the command server 14 to supply to the command analysis unit 44.

The command analysis unit 44 acquires the video switch command from the communication I/F 43. The command analysis unit 44 analyzes the acquired video switch command and supplies an analysis result thereof to the control unit 45. The control unit 45 supplies the analysis result for the video switch command from the command analysis unit 44 to the change-over controller 48.

The change-over controller 48 controls the operation of changing over from the broadcast content to the distribution content on the basis of the analysis result for the video switch command from the control unit 45. Additionally, the change-over controller 48 controls the communication I/F 43 to access the distribution server 15 via the Internet 16 and request for the distribution content. The communication I/F 43 receives the distribution content transmitted from distribution server 15 to supply to the streaming processor 49.

The streaming processor 49 subjects the data of the distribution content supplied from the communication I/F 43 to a process required for streaming reproduction and supplies the distribution content for streaming reproduction obtained as a result thereof to the content decoder 50.

The content decoder 50 separates an AV stream constituting the distribution content for streaming reproduction supplied from the streaming processor 49 into the video stream and the audio stream. The content decoder 50 decodes the separated video stream and audio stream respectively and supplies the video signal and audio signal obtained as a result thereof to the switch 38.

The reception device 12 is configured as described above.

Cooperation Among Devices

Figure 3:
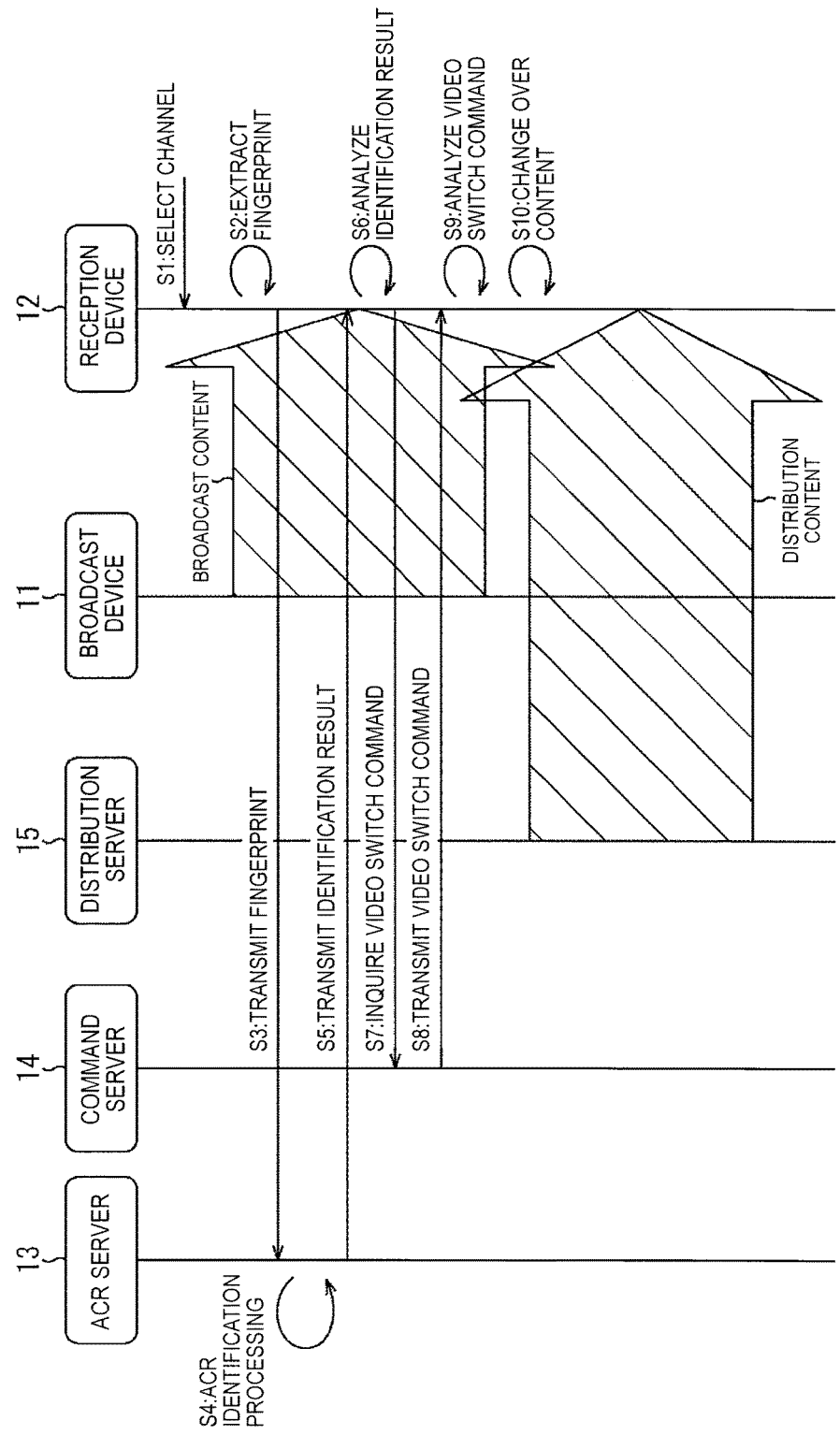
FIG. 3 is a sequence diagram illustrating cooperation among devices.
Figure 4:
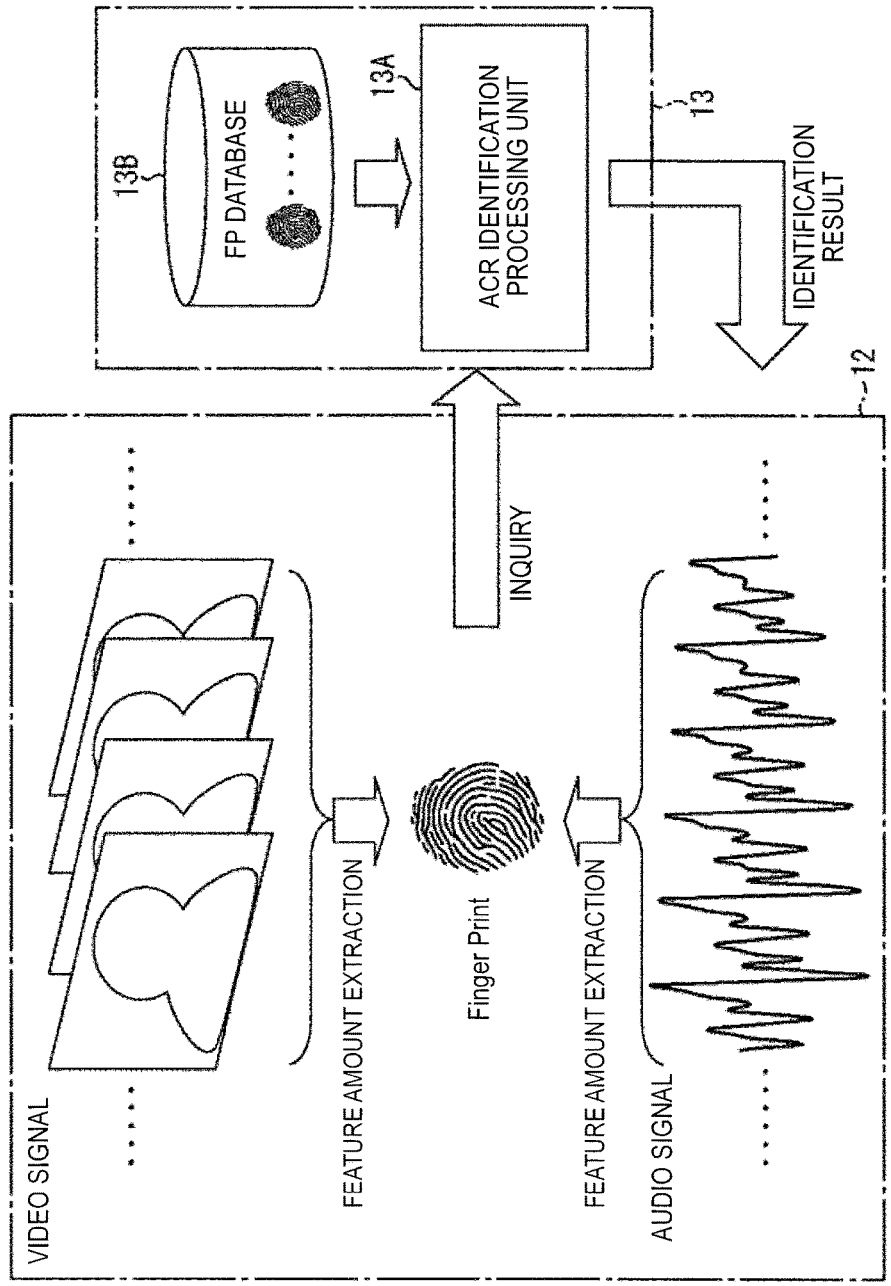
FIG. 4 is a diagram for explaining a concept of ACR technology.

Next, with reference to FIG. 3 to FIG. 5, an explanation will be given of cooperation among devices constituting the broadcast system 1 in FIG. 1. FIG. 3 is a sequence diagram illustrating the cooperation among devices upon the content change-over.

As shown in FIG. 3, the broadcast device 11 transmits the digital television broadcast signal. The reception device 12 selects a channel desired by the user to receive the digital television broadcast signal from the broadcast device 11. The reception device 12 displays the video of the broadcast content corresponding to the received broadcast signal on the display 21 and outputs the audio corresponding to the same from the speaker 22 (S1).

Further, the reception device 12 periodically extracts the feature amounts from the video signal and audio signal of the broadcast content (S2), these feature amounts are transmitted as the finger print information to the ACR server 13 (S3).

The ACR server 13 performs an ACR identification processing to identify the broadcast content of the channel being selected by the reception device 12 by collating the finger print information from the reception device 12 with the database (S4). Specifically, as shown in FIG. 4, when the ACR server 13 receives the inquiry by way of the finger print information from the reception device 12, an ACR identification processing unit 13A collates the finger print information with an FP database 13B prepared in advance to identify the broadcast content of the channel being selected by the reception device 12.

Here, the finger print information (feature amount) is, for example, inherent information on the entire pieces of broadcast content or partial constituent elements, and the FP database 13B has registered therein the inherent information on a large number of pieces of broadcast content in advance. The ACR identification processing determines a degree of similarity or coincidence of the inherent information, for example. Note that as a determination method of the degree of similarity or coincidence, known techniques disclosed in various literatures and the like can be used. Usage of the ACR technology can make it possible to identify the broadcast content from the feature amount in the video signal and audio signal without depending on the information such as resolution, aspect ratio, bit rate, or format of the broadcast content.

In this ACR identification processing, obtained are information for identifying a channel number of the broadcast content such as a program (hereinafter, referred to as channel identification information) and information indicating a time position where the finger print information is extracted in a case of representing the relevant broadcast content in terms of a timeline from the start to the end thereof (hereinafter, referred to as time position information). In addition, the FP database 13B has stored therein information indicating a destination for acquisition of the video switch command (hereinafter, referred to as command acquisition destination information) in association with the channel identification information. For example, as the command acquisition destination information, a URL (uniform resource locator) of the command server 14 is described.

The ACR identification processing unit 13A acquires the command acquisition destination information corresponding to the identified channel number from the FP database 13B. Then, the ACR identification processing unit 13A transmits the channel identification information, time position information, and command acquisition destination information as an identification result of the ACR identification processing to the reception device 12 which is a source of the inquiry (S5).

The reception device 12 acquires the identification result from the ACR server 13 to analyze the identification result (S6). In addition, the reception device 12, in accordance with the analysis result for the identification result, accesses the command server 14 at the URL described in the command acquisition destination information and transmits the channel identification information and time position information to inquire the video switch command which is to be executable in the reception device 12 (S7).

The command server 14 transmits the video switch command corresponding to the channel identification information and time position information to the reception device 12 in response to the inquiry from the reception device 12 (S8). Specifically, the command server 14 manages the video switch command to be executable for each piece of broadcast content depending on a content change-over timing scheduled in advance, for example.

The command server 14 specifies the video switch command which is to be executable in a time zone corresponding to the time position information in the broadcast content corresponding to the channel identification information from the reception device 12. For example, the command server 14 specifies, on the basis of the time position information from the reception device 12, one or more video switch commands to be operated while a duration (e.g., for a few seconds) from a time when the target finger print information is extracted in the reception device 12 to a time when the next finger print information is extracted. Then, the command server 14 transmits the specified video switch command via the Internet 16 to the reception device 12.

The reception device 12 acquires and analyzes the video switch command from the command server 14 (S9). Then, the reception device 12, in accordance with the analysis result for the video switch command, requests the distribution server 15 for the distribution content to change over from the broadcast content to the distribution content (S10).

For example, as shown in FIG. 5, the reception device 12 acquires the video switch command depending on the identification result of the ACR identification processing on the broadcast content such that the broadcast content is changed over to distribution content A in response to the acquired video switch command. In addition, the reception device 12 acquires the video switch command depending on the result of the ACR identification processing on the distribution content A of a change-over destination such that the distribution content A is changed over to distribution content B in response to the relevant video switch command.

Then, when the reception device 12 completes reproduction of the distribution content B, reproduction of the distribution content A is resumed and further, when the reproduction of the distribution content A is completed, the broadcast content is resumed to be viewed. Note that as shown in FIG. 5, for example, a content resuming position in the case of returning from the change-over destination content to change-over original content can be set such that the reproduction is resumed from a scene at the time of changing over as in the case of returning from the distribution content B to the distribution content A. Further, the content resuming position may be set such that, as in the case of returning from the distribution content A to the broadcast content, the reproduction may be resumed from a scene in the broadcast content which is being broadcasted at this time. These content resuming positions are controlled depending on the pass-through mode or retention mode which is described later.

As described above, the cooperation among the devices constituting the broadcast system 1 allows the reception device 12 to be provided with the video switching command corresponding to the identification result obtained from the ACR identification processing on the content being viewed. Then, the reception device 12 performs the change-over process between the broadcast content and the distribution content in response to the video switching command.

Detail of Video Switching Command

Next, with reference to FIG. 6 to FIG. 10, an explanation will be given of five kinds of video switch commands. The video switch commands are classified into any of a switch command, preload command, preselect command, enable switch command, or disable switch command.

FIG. 6 shows elements constituting the video switch command as the switch command. The switch command is a command for controlling the reception device 12 to change over the output content, that is, to change over a stream which is to be decoded and output.

Switch ID is identification information given to an event in which the stream is changed over. Command Code is a code number indicating that the relevant video switch command is the switch command.

Switching Time indicates a time to perform the relevant command for carrying out stream change-over. This time is specified by way of an absolute time and date, relative time or PTS, for example. The absolute time and date is specified in a case where the switch command is performed when a certain time and date set in advance arrives regardless of a progress of the broadcast content. Additionally, the relative time is specified in a case where the switch command is performed when a certain time period is lapsed from a time as a reference in the broadcast content. For example, a relative time period from the start time of the broadcast content is specified as the relative time.

Further, the PTS is specified in a case where the switch command is performed by use of the PTS (presentation time stamp) which is time information for carrying out synchronized reproduction. In other words, to Switching Time, a system specifying with hour, minute and second and a system specifying with an STC (system time clock) value of TS can be applied.

Target Media Type indicates whether the stream of the change-over destination is the broadcast content, MP4 format distribution content, MPEG2_TS format distribution content, or AVC_TS format distribution content. Target Stream URL indicates a destination URL for acquisition of the stream of the change-over destination. Stream Start Position indicates a reproduction start time position of the stream of the change-over destination. This reproduction start time position is specified in seconds, for example.

Retention Mode indicates which mode of the pass-through mode or the retention mode is used for a mode in changing over between the broadcast content and the distribution content. Here, a mode upon the content changing-over is described later in detail with reference to FIG. 11.

Personalized Mode indicates whether or not user authentication is required in acquiring the distribution content as well as which of a device ID or password of the reception device 12 is used upon the relevant user authentication. This makes it possible to set the switch command for each user. Auto Switch Flag indicates whether to confirm with the user about the stream change-over before that. Switching Message is a question sentence presented to the user in the case of confirming with user about the stream change-over before that.

Return Flag indicates whether or not the reproduction is resumed from a scene at the time of changing over the stream of the change-over original after the stream of the change-over destination is completed. Note that instead of Retention Mode and Return Flag described above, Loop Back Mode in which those elements are combined into one unit may be added as an element. In other words, Loop Back Mode specifies whether a non-loop back mode is set or a loop back mode is set. Here, the loop back mode indicates that after changing over the stream, the reproduction is resumed from a scene at the time of changing over the stream of the change-over original after the stream of the change-over destination is completed. The non-loop back mode indicates the cases of change-over other than the loop back mode.

FIG. 7 shows elements constituting the video switch command as the preload command. The preload command is a command for controlling the reception device 12 to receive the change-over destination content prior to the content change-over timing.

Switch ID is identification information given to an event in which the stream is changed over. Command Code is a code number indicating that the relevant video switch command is the preload command.

Target Media Type indicates whether the stream of the change-over destination is the broadcast content, MP4 format distribution content, MPEG2_TS format distribution content, or AVC_TS format distribution content. Target Stream URL indicates a destination URL for acquisition of the stream of the change-over destination. Stream Start Position indicates a reproduction start time position of the stream of the change-over destination.

Loop Back Mode specifies which of the above described non-loop back mode or loop back mode is set.

Personalized Mode indicates whether or not the user authentication is required in acquiring the distribution content as well as which of a device ID or password of the reception device 12 is used upon the relevant user authentication. This makes it possible to set the preload command for each user. Time to Switch indicates an estimated time period until the change-over to the content which is acquired in response to the relevant preload command. This estimated time period is set in seconds, for example.

FIG. 8 shows elements constituting the video switch command as the preselect command. The preselect command is a command for controlling the reception device 12 to confirm with the user about whether the content change-over is required prior to the content change-over timing.

Switch ID is identification information given to an event in which the stream is changed over. Command Code is a code number indicating the relevant video switch command is the preselect command.

Switching Message is the question sentence presented to the user in the case of confirming with user about the stream change-over before that. Time to Switch indicates an estimated time period until the change-over to the stream which is selected in response to the relevant preselect command.

FIG. 9 shows elements constituting the video switch command as the enable switch command. The enable switch command is a command for controlling the reception device 12 to acquire a VRT capable of viewpoint switching for the content which is a panorama type multiple-perspective video program or theater type multiple-perspective video program, for example.

Switch ID is identification information given to an event in which the stream is changed over. Command Code is a code number indicating that the relevant video switch command is the enable switch command.

Switching Meta URL is a destination URL for acquisition of VRT. Here, the VRT (view relation table) is a table referred to when the content is changed over and includes information such as a viewpoint column type of each of a plurality of multiple-perspective videos constituting the relevant content, and a destination URL for acquisition, for example. The reception device 12 can perform the viewpoint switching for the content which is the panorama type multiple-perspective video program or theater type multiple-perspective video program on the basis of the information included in the VRT.

FIG. 10 indicates elements constituting the video switch command as the disable switch command. The disable switch command is a command for controlling the reception device 12 to disable the acquired VRT so as to be incapable of the viewpoint switching for the content which is the panorama type multiple-perspective video program or theater type multiple-perspective video program, for example.

Switch ID is identification information given to an event in which the stream is changed over. Command Code is a code number indicating that the relevant video switch command is the disable switch command.

As described above, the video switch command is explained in detail.

Detail of Mode Upon Content Change-Over

Figure 11:
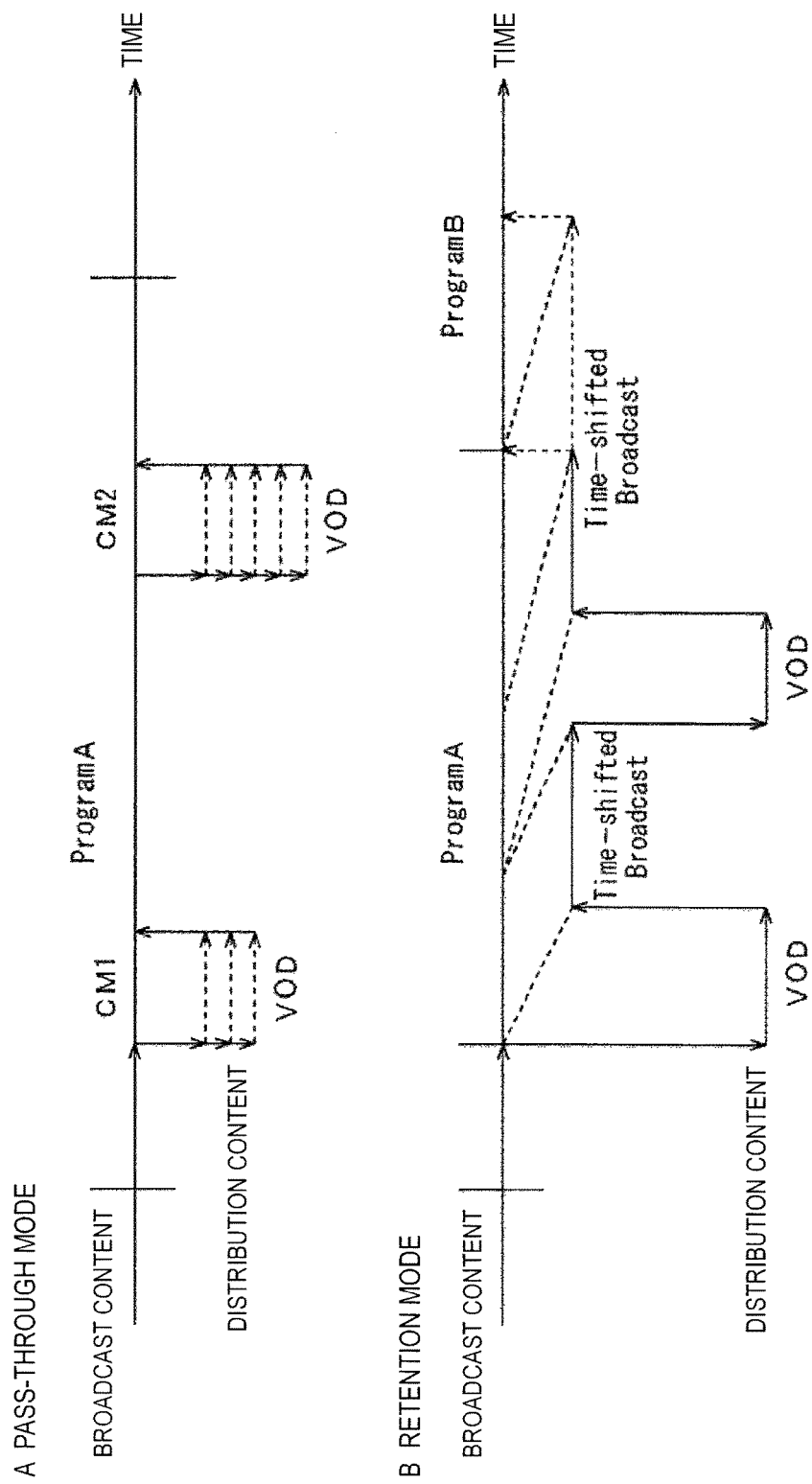
FIG. 11 is a diagram for explaining a mode in changing-over between broadcast content and distribution content.

Next, an explanation will be given in detail of the pass-through mode and retention mode described above. FIG. 11 is a diagram illustrating an exemplary mode in changing over between the broadcast content and the distribution content.

First, with reference to A of FIG. 11, the pass-through mode will be explained.

The pass-through mode is a mode for the change-over in which after the reproduction of the distribution content which has been changed over from the broadcast content, when again returning from the distribution content to the broadcast content, the change-over is carried out to a scene in the broadcast content being broadcasted at this time.

For example, as shown in A of FIG. 11, in a case where a program (Program A) is broadcasted as the broadcast content, the change-over to the distribution content may be carried out only when CM1 and CM2 inserted during the program are broadcasted. In this case, when returning from the distribution content to the broadcast content, the broadcast content is not displayed which corresponds to the duration while the distribution content such as CM1 and CM2 is displayed, and the program being broadcasted at this time (Program A) is displayed.

The operation of the reception device 12 in this case is such that in changing over from the broadcast content to the distribution content, the retention buffer 33 supplies due to zero delay the TS data from the primary demultiplexer 32 to the secondary demultiplexer 35. Then, since the secondary demultiplexer 35 does not need data of the broadcast content while the distribution content is displayed, the TS data is discarded. This allows the scene of the broadcast content being broadcasted at that time to be displayed on a screen of the display 21 when returning from the distribution content to the broadcast content after that.

Next, with reference to B of FIG. 11, the retention mode will be explained.

The retention mode is a mode for the change-over in which after the reproduction of the distribution content which has been changed over from the broadcast content, when again returning from the distribution content to the broadcast content, the change-over is carried out to a scene in broadcast content at the time of changing over from the broadcast content to the distribution content.

For example, as shown in B of FIG. 11, in a case where broadcast content (Program A) is broadcasted as the broadcast content, the change-over may be carried out at a predetermined timing from the broadcast content to the distribution content. In this case, the distribution content is inserted into the broadcast content, and data of the broadcast content corresponding to the duration while the distribution content is displayed is stored in the retention buffer 33. Then, when returning from the distribution content to the broadcast content, the broadcast content data is read out from the retention buffer 33 to resume and display the broadcast content (Program A) from the scene at the time of change-over with time shifted.

Note that when returning from the distribution content to the broadcast content, in a case where the broadcast content (Program A) broadcasted in real time is completed and other broadcast content (Program B) is started, the broadcast content (Program A) may be resumed from a scene in midway thereof or the other broadcast content (Program B) may be resumed from the top.

The operation of the reception device 12 in this case is such that in changing over from the broadcast content to the distribution content, the TS data from the primary demultiplexer 32 is sequentially written into and stored in the retention buffer 33. At this time, since reading out of the TS data is stopped in the retention buffer 33, the TS data while the distribution content is displayed is sequentially stored in the retention buffer 33. After that, when returning from the distribution content to the broadcast content, the retention buffer 33 has stored therein the TS data while the distribution content is reproduced, which TS data is supplied to the secondary demultiplexer 35. This allows the scene in the broadcast content at the time of changing over from the broadcast content to the distribution content to be displayed on the screen of the display 21.

Explanation of Reception Device Operation

Next, an explanation will be given of three kinds of utilization examples of the video switch command described above.

Figure 12:
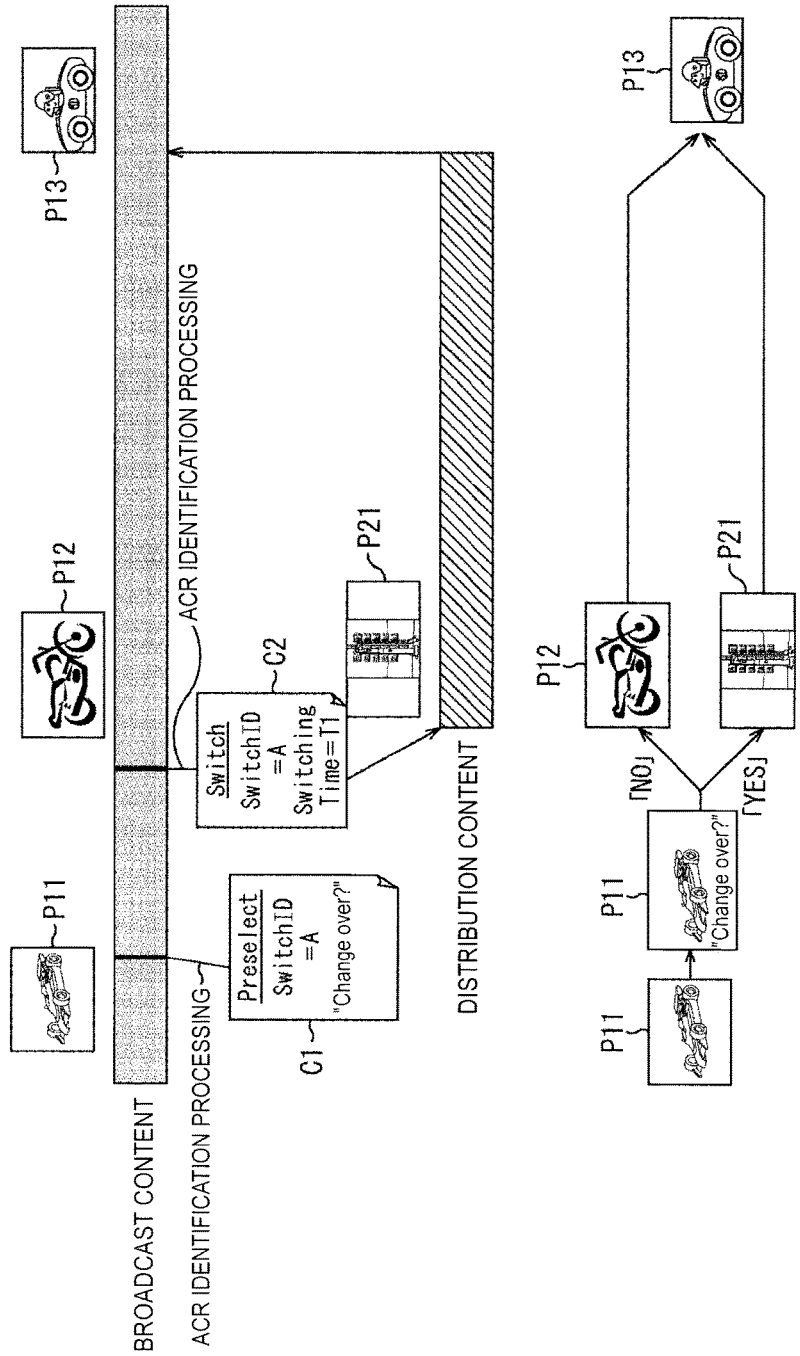
FIG. 12 is a diagram explaining a utilization example of the preselect command in an auto-switching operation.

FIG. 12 shows a utilization example of the preselect command in an auto-switching operation.

In the relevant utilization example, the reception device 12, in a case of changing over from the broadcast content to the distribution content, receives a preselect command C1 corresponding to the identification result obtained by the ACR identification processing on the broadcast content prior to the change-over timing. After that, the reception device 12 receives a switch command C2 corresponding to the identification result obtained by the ACR identification processing on the broadcast content.

In other words, the reception device 12, in response to the preselect command C1, prompts the user to select whether to execute the content change-over. Here, in a case where, for example, in response to a message "change over?" superimposed on the video of the broadcast content P11 being viewed, the user selects the content change-over, an auto-switch is set for a content change-over event indicated by Switch ID of the preselect command C1. In contrast, in a case where the user selects the no content change-over, the no change-over is set for the content change-over event indicated by Switch ID of the preselect command C1.

After that, in the reception device 12, when the switch command C2 is received, in the case where the auto-switch is set in response to the above preselect command C1, the content change-over is automatically carried out after a time for content change-over arrives. For example, in the example in FIG. 12, first, the auto-switch is set for a content change-over event of Switch ID=A by way of the preselect command C1, and thereafter, the time for change-over from the broadcast content to the distribution content is set at a content change-over event of Switch ID=A by way of the switch command C2. Then, when Switching Time=T1 lapses, the change-over is carried out from a video P11 of the broadcast content to a video P21 of the distribution content. In the case of carrying out the content change-over, the pass-through mode or the retention mode is determined in response to Retention Mode in the switch command C2. In the example of FIG. 12, since the pass-through mode is set, a video P13 of the broadcast content is displayed on the display 21 when the video P21 of the distribution content is completed.

On the other hand, in the case where the no change-over is set for a content change-over event of Switch ID=A, the content change-over is not carried out, and change-over is carried out from the video P11 of the broadcast content to a video P12 thereof, for example. Then, when the video P12 of the broadcast content is completed, the video P13 is displayed on the display 21.

As described above, in the utilization example of the preselect command in the auto-switching operation, in the case where whether to execute the change-over is confirmed prior to the relevant content change-over and the content change-over is selected, the content change-over is automatically carried out after a predetermined time for change-over arrives.

However, in the case of the utilization example in FIG. 12, since the distribution content of the change-over destination is acquired in response to the switch command, the content may not be quickly changed over. Therefore, next, a utilization example in which the content can be quickly changed over will be explained.

Figure 13:
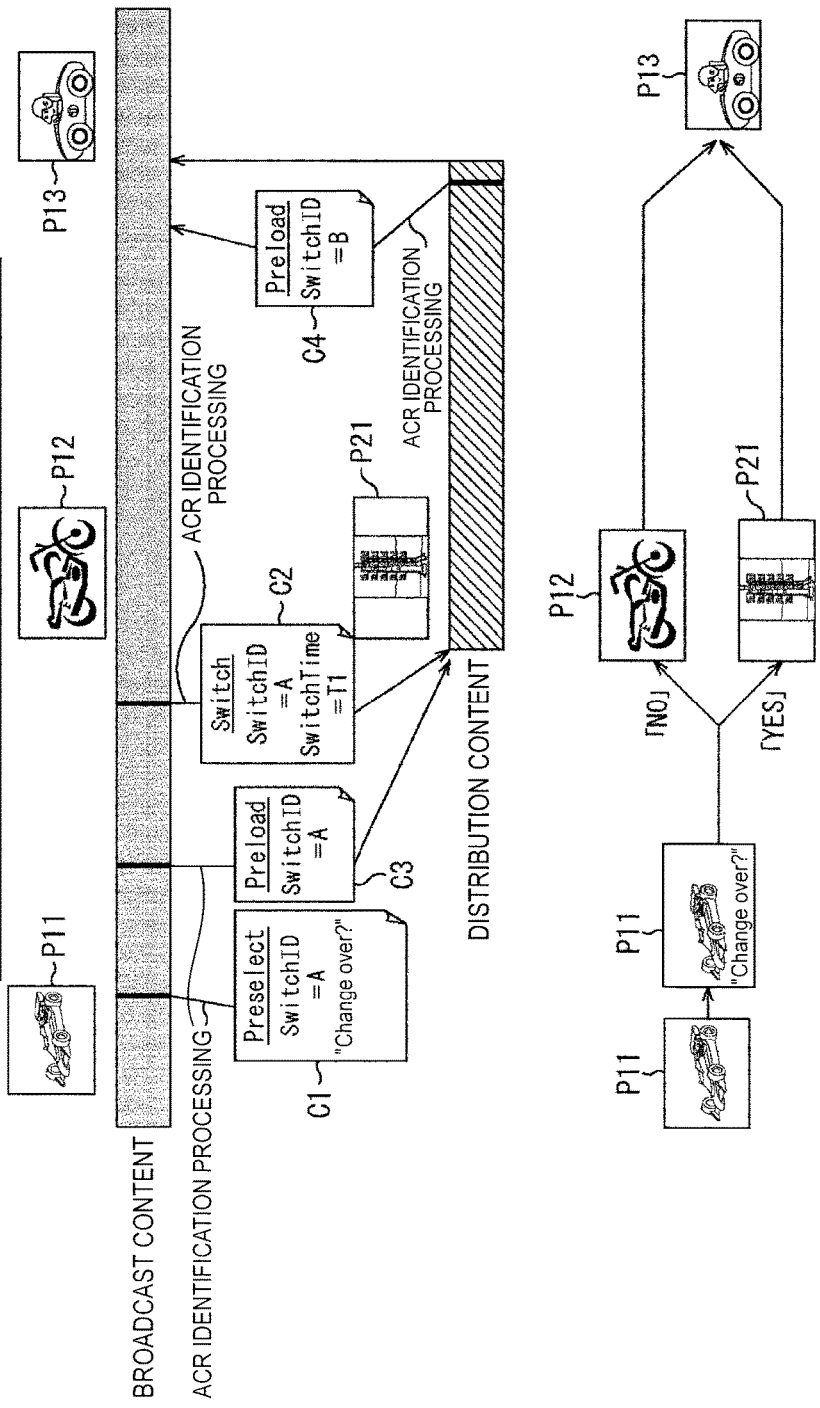
FIG. 13 is a diagram explaining utilization examples of the preselect command and preload command in the auto-switching operation.

FIG. 13 shows a utilization example of the preselect command and preload command in the auto-switching operation.

In the relevant utilization example, the reception device 12, in the case of change-over from the broadcast content to the distribution content, receives the preselect command C1 and preload command C3 corresponding to the identification result obtained by the ACR identification processing on the broadcast content prior to the change-over timing. After that, the reception device 12 receives the switch command C2 corresponding to the identification result obtained by the ACR identification processing on the broadcast content at a timing prior to the change-over.

In other words, the reception device 12, in response to the preselect command C1, prompts the user to select whether to execute the content change-over. Here, in a case where, for example, in response to a message "change over?" superimposed on the video of the broadcast content P11, the user selects the content change-over, an auto-switch is set for a content change-over event indicated by Switch ID of the preselect command C1. Then, when the reception device 12 receives the preload command C3, the distribution content of the change-over destination is started to be acquired in response to the preload command C3. After that, in the reception device 12, when the switch command C2 is received, in the case where the auto-switch is set in response to the above preselect command C1, the content change-over is quickly carried out from the broadcast content to the preloaded distribution content after a time for content change-over arrives.

For example, in the example in FIG. 13, first, the auto-switch is set for a content change-over event of Switch ID=A by way of the preselect command C1, and thereafter, the distribution content is started to be acquired from the distribution server 15 designated by way of the preload command C3. In addition, the time for change-over from the broadcast content to the distribution content is set at a content change-over event of Switch ID=A by way of the switch command C2. Then, when Switching Time=T1 lapses, the change-over is carried out from the video P11 of the broadcast content to a video P21 of the preloaded distribution content. In other words, since the distribution content of the change-over destination is already preloaded upon the change-over, the change-over is quickly carried out from the video P11 to the video P21.

After that, the reception device 12 receives a preload command C4 corresponding to an identification result obtained by the ACR identification processing on the distribution content and the broadcast content is started to be acquired from the broadcast device 11 designated by way of the preload command C4. Then, in the reception device 12, when reproduction of the distribution content is completed, the change-over is quickly carried out from distribution content to the preloaded broadcast content. Here, also in the example of FIG. 13, since the pass-through mode is set, the video P13 of the broadcast content is displayed on the display 21 when the video P21 of the distribution content is completed.

As described above, in the utilization example of the preselect command and preload command in the auto-switching operation, in the case where whether to execute the change-over is confirmed prior to the relevant content change-over and the content change-over is selected, the change-over destination content is acquired in advance. Then, the change-over is automatically carried out to content acquired in advance after a predetermined time for change-over arrives.

In this way, in the case of the utilization example in FIG. 13, since the distribution content of the change-over destination is acquired in response to the preload command, the content can be quickly changed over.

Figure 14:
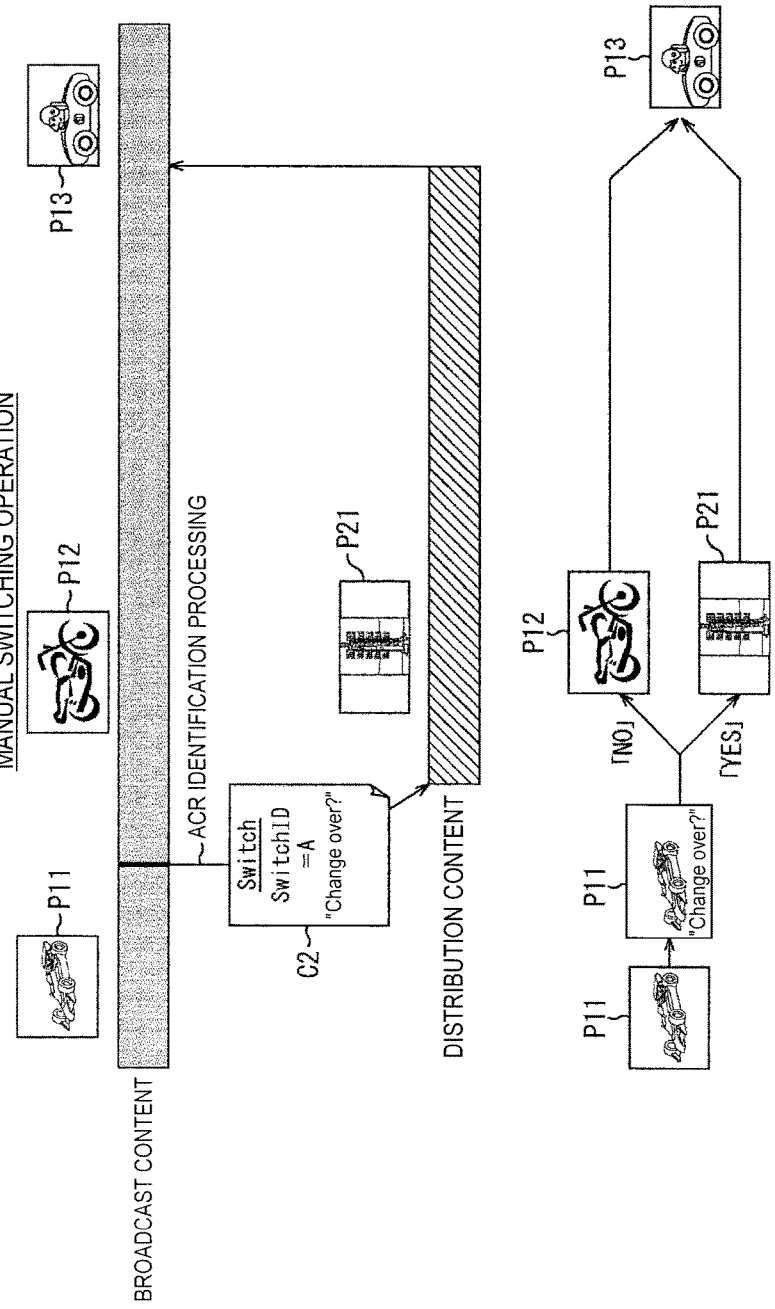
FIG. 14 is a diagram explaining a utilization example of the switch command in a manual switching operation.

FIG. 14 shows a utilization example of the switch command in a manual switching operation.

In the relevant utilization example, the reception device 12, in a case of changing over from the broadcast content to the distribution content, receives at the change-over timing the switch command C2 corresponding to the identification result obtained by the ACR identification processing on the broadcast content.

In other words, the reception device 12, in a case where the Auto Switch Flag in the switch command C2 is set to a manual switch, displays toward the user a message such as "change over?" to prompt the user to select whether to execute the content change-over. Here, in a case where the user selects the content change-over, the distribution content of the change-over destination is started to be acquired and the content is changed over.

Note that in a case where Retention Mode in the switch command C2 is set to the retention mode, the data of the change-over original broadcast content is buffered even while waiting for a selection operation input from the user such that a video display state is brought into a pause state. In addition, in a case where Retention Mode in the switch command is set to the pass-through mode, while waiting for the selection operation input from the user, the change-over original broadcast content is passed through to continue to display the video of the broadcast content.

In the example of FIG. 14 also, since the pass-through mode is set, when the video P21 of the distribution content is completed, the video P13 of the broadcast content is displayed on the display 21.

As described above, in the utilization example of the switch command in the manual switching operation, in the case where whether to execute the change-over is confirmed at the relevant content change-over timing, and the content change-over is selected, the change-over is carried out to the change-over destination content.

Command Correspondent Process Corresponding to ACR Identification Result

Next, with reference to FIG. 15 to FIG. 20, an explanation will be given of a command correspondent process (hereinafter, referred to as command correspondent process corresponding to the ACR identification result) in a case where the reception device 12 receives the video switch command corresponding to the identification result obtained by the ACR identification processing.

Figure 15:
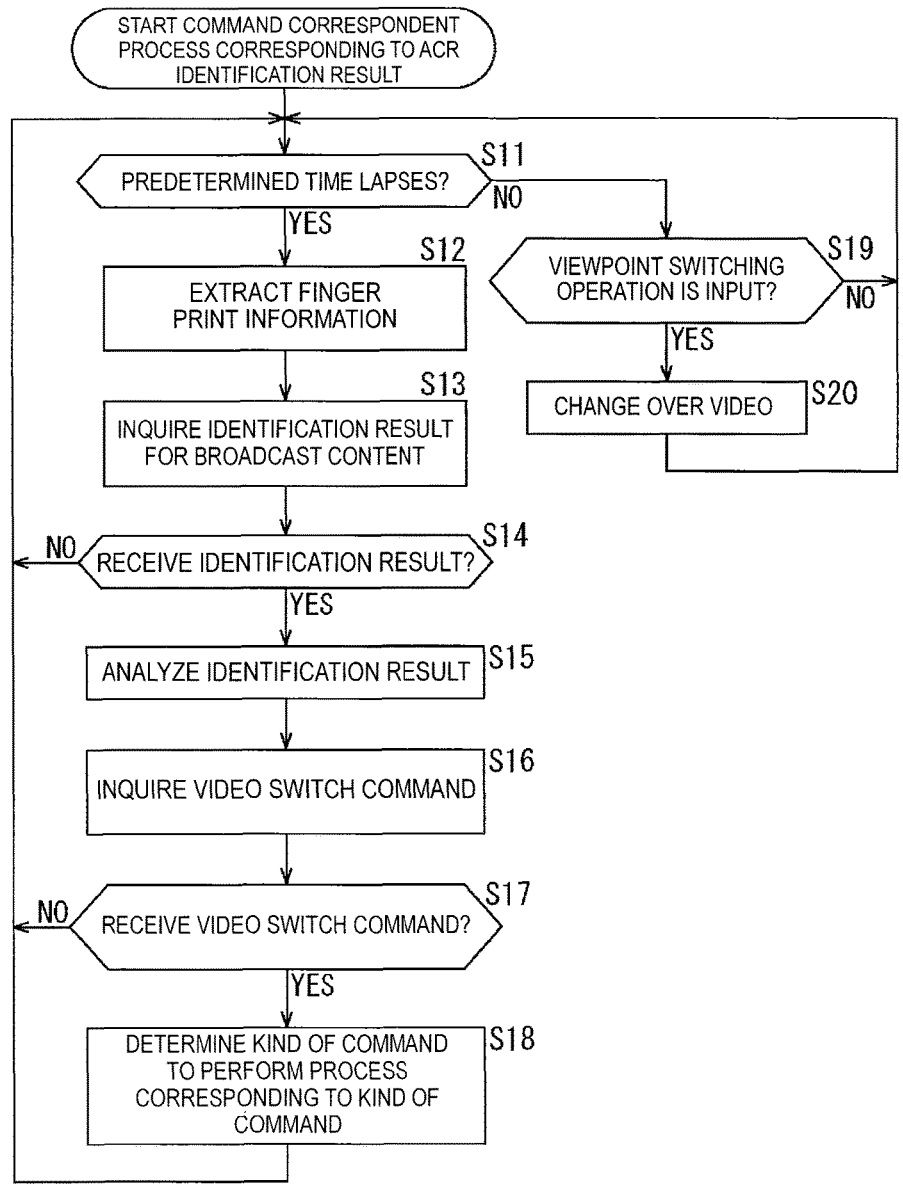
FIG. 15 is a flowchart illustrating a command correspondent process depending on an ACR identification result.

FIG. 15 is a flowchart illustrating the command correspondent process corresponding to the ACR identification result by the reception device 12. This command correspondent process corresponding to the ACR identification result is repeatedly performed when the user views the broadcast content such as a program, that is, while the reception device 12 is receiving the digital television broadcast signal from the broadcast device 11.

The finger print extraction unit 42, at step S11, determines whether or not a predetermined time lapses and waits for the predetermined time to lapse to extract the finger print information from the video signal and audio signal of the broadcast content (step S12). In other words, the finger print extraction unit 42 extracts the finger print information periodically at a predetermined interval of, for example, several seconds.

At step S13, the finger print extraction unit 42 controls the communication I/F 43 to transmit the extracted finger print information via the Internet 16 to the ACR server 13 to inquire the identification result for the broadcast content of the channel being selected. The ACR server 13 performs the ACR identification processing on the basis of the finger print information to transmit the identification result therefor to the reception device 12. Note that when the ACR server 13 cannot get the identification result for the broadcast content, the identification result is not transmitted.

At step S14, the control unit 45 controls the communication I/F 43 to determine whether or not the identification result is received from the ACR server 13 as an identification result inquiry destination.

At step S14, if determined that the identification result is not received, the process returns to step S11, and this and subsequent processes are repeated. For example, in a case where the reception device 12 selects a channel of halted broadcast, if the finger print information is extracted, the broadcast content cannot be identified on the ACR server 13 side such that the identification result is not transmitted (or such that the identification result may be transmitted with presenting there is no corresponding content).

On the other hand, at step S14, if determined that the identification result is received, the process proceeds to step S15, and at step S15 the control unit 45 analyzes the identification result for the broadcast content of the channel being selected, the content being received by the communication I/F 43. Here, obtained as the identification result are the channel identification information, time position information, and command acquisition destination information of the broadcast content of the channel being selected.

At step S16, the control unit 45 controls the communication I/F 43, accesses the command server 14 corresponding to the URL indicated by the command acquisition destination information and transmits the channel identification information and time position information to inquire the video switch command which is to be executable in the reception device 12. The command server 14 acquires and transmits to the reception device 12 the video switch command which is to be executable in the time zone corresponding to the time position information in the broadcast content corresponding to the channel identification information on the basis of the schedule set in advance.

At step S17, the control unit 45 controls the communication I/F 43 to determine whether or not the video switch command is received from the command server 14 as a video switch command inquiry destination.

At step S17, if determined that the video switch command is not received, the process returns to step S11, and this and subsequent processes are repeated. For example, in a case where the command server 14 has no video switch command matching conditions defined in the channel identification information and time position information, the video switch command is not transmitted (or the video switch command may be transmitted with presenting no process is needed).

On the other hand, at step S17, if determined that the video switch command is received, the process proceeds to step S18. At step S18, the command analysis unit 44 analyzes the video switch command. In addition, the change-over controller 48, depending on the analysis result for the video switch command, performs a process corresponding to a kind of the command indicated by Command Code thereof. The process corresponding to a kind of each video switch command will be described later in detail with reference to FIGS. 16 to 20.

Note that if determined that at step S11 a predetermined time does not lapse, the process proceeds to step S19. At step S19, the control unit 45 determines whether or not the user inputs a viewpoint switching operation. At step S19, if determined that the viewpoint switching operation is not input, the process returns to step S11.

Here, the viewpoint switching operation input by the user is enabled only when the viewpoint switching is enabled in the enable switch correspondent process in FIG. 19 described later. On the other hand, if determined that at step S19 the viewpoint switching operation is input by the user, the process proceeds to step S20. At step S20, the control unit 45 controls each related unit in the reception device 12 to receive and reproduce the distribution content corresponding to a designated viewpoint for changing over the video.

As described above, the command correspondent process corresponding to the ACR identification result is explained.

Preselect Command Correspondent Process

Figure 16:
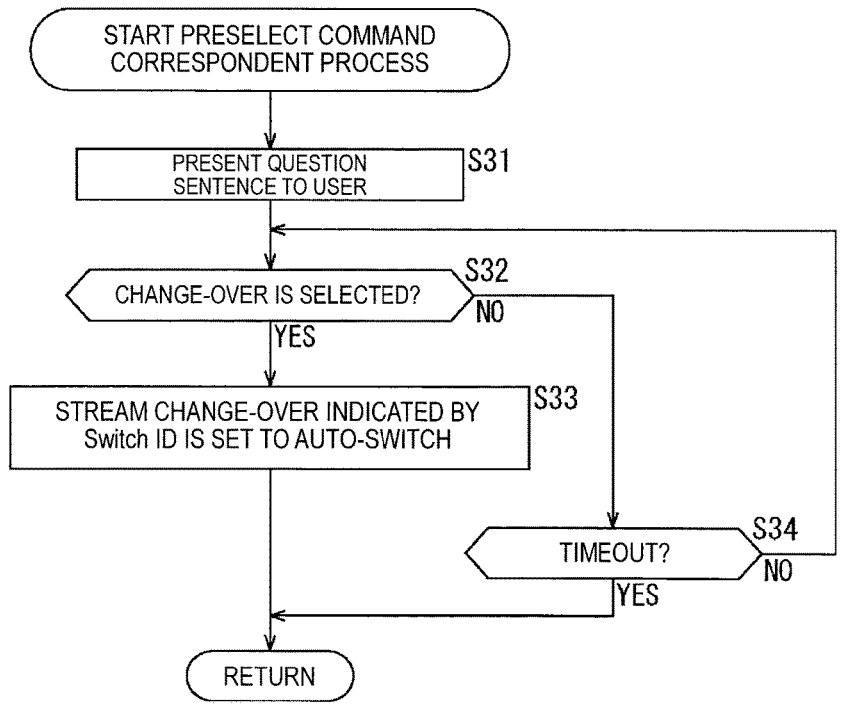
FIG. 16 is a flowchart illustrating a preselect command correspondent process.

FIG. 16 is a flowchart illustrating a process in a case where the received video switch command is a preselect command and corresponds to step S18 in FIG. 15 (hereinafter, referred to as preselect command correspondent process).

At step S31, the change-over controller 48 presents a question sentence described in Switching Message of the preselect command to the user to prompt to select whether to change over the content. At step S32, the change-over controller 48 determines whether or not the content change-over is selected correspondingly to an instruction from the user with respect to the presented question sentence.

At step S32, if the content change-over is selected, the process proceeds to step S33. At step S33, the change-over controller 48 sets the auto-switch to the content change-over indicated by Switch ID of the preselect command.

Note that if the content change-over is not selected at step S32 or if the selection timeout lapses, the preselect command correspondent process ends. The timeout is decided on the basis of Time to Switch. Then, when the preselect command correspondent process ends, the process returns to step S18 in FIG. 15, and this and subsequent processes are performed.

As described above, the preselect command correspondent process is explained.

Preload Command Correspondent Process

Figure 17:
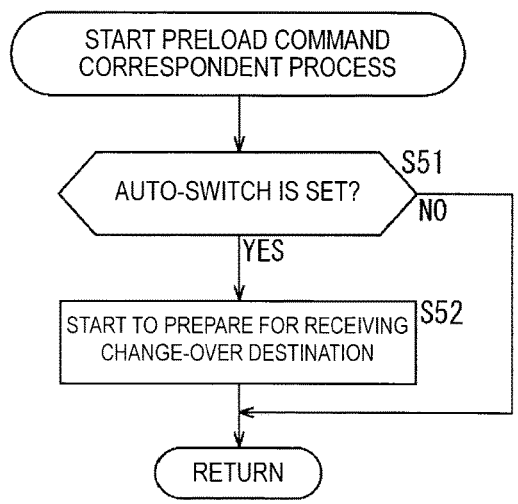
FIG. 17 is a flowchart illustrating a preload command correspondent process.

FIG. 17 is a flowchart illustrating a process in a case where the received video switch command is a preload command and corresponds to step S18 in FIG. 15 (hereinafter, referred to as preload command correspondent process).

At step S51, the change-over controller 48 determines whether or not the content change-over indicated by Switch ID of the preload command is set with the auto-switch in response to the preselect command received prior to the relevant preload command. If determined that at step S51 the auto-switch is set, the process proceeds to step S52. At step S52, the change-over controller 48 controls each related unit in the reception device 12 to start to prepare for receiving the distribution content of the change-over destination.

Here, if determined that at step S51 the content change-over indicated by Switch ID of the preload command is not set with auto-switch, the preload command correspondent process ends. Then, when the preload command correspondent process ends, the process returns to step S18 in FIG. 15, and this and subsequent processes are performed.

As described above, the preload command correspondent process is explained.

Switch Command Correspondent Process

Figure 18:
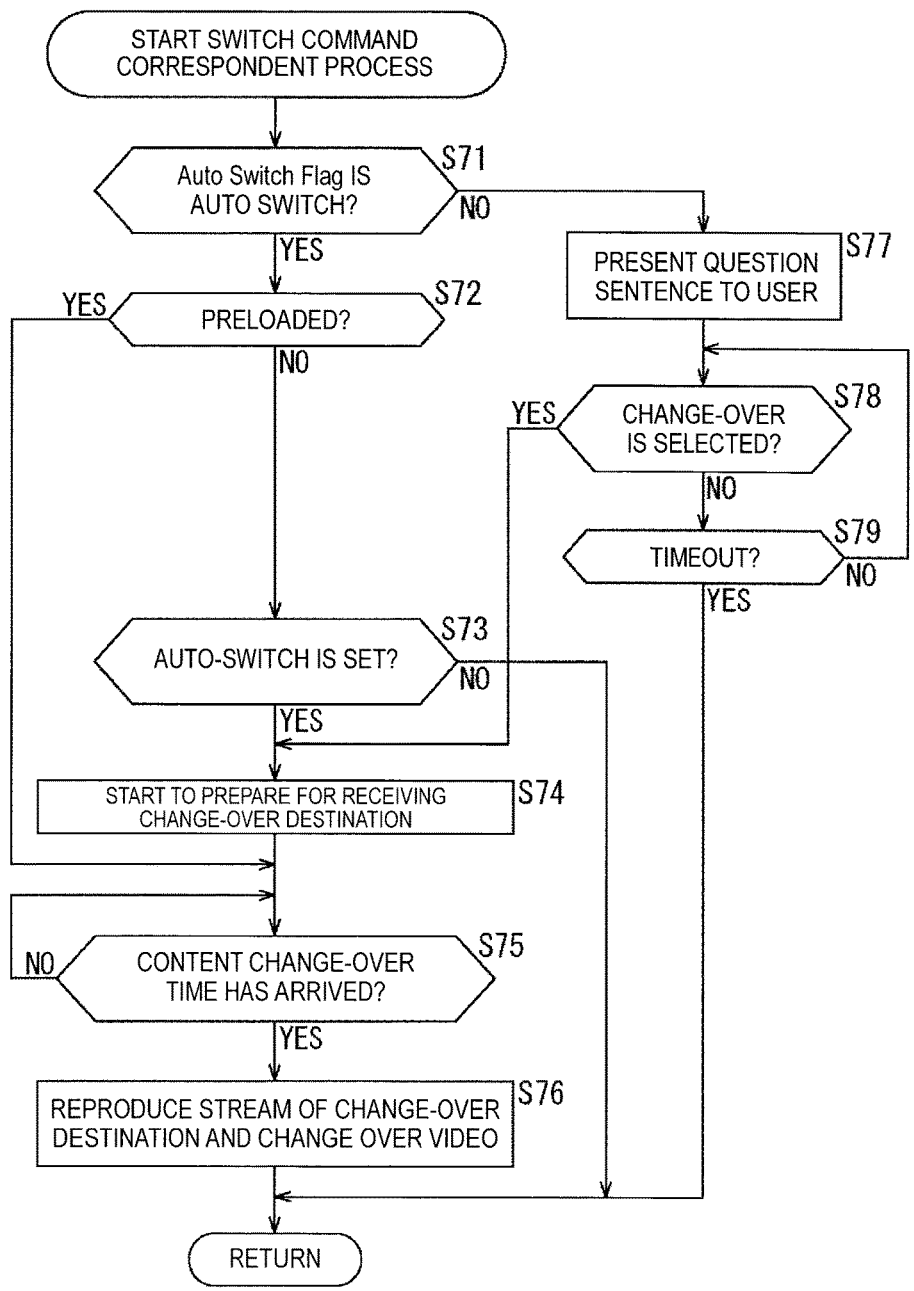
FIG. 18 is a flowchart illustrating a switch command correspondent process.

FIG. 18 is a flowchart illustrating a process in a case where the received video switch command is a switch command and corresponds to step S18 in FIG. 15 (hereinafter, referred to as switch command correspondent process).

At step S71, the change-over controller 48, in accordance with the analysis result for the video switch command from the control unit 45, determines whether or not Auto Switch Flag of the switch command is the auto-switch. If determined that at step S71 it is the auto-switch, the process proceeds to step S72. At step S72, the change-over controller 48, in accordance with the analysis result for the video switch command from the control unit 45, determines whether or not the distribution content of the change-over destination is already preloaded. If determined that at step S72 it is not already preloaded, the process proceeds to step S73.

At step S73, the change-over controller 48, in accordance with the analysis result for the video switch command from the control unit 45, determines whether or not the content change-over indicated by Switch ID is set with the auto-switch in response to the preselect command received prior to the relevant switch command. If determined that at step S73 the auto-switch is set, the process proceeds to step S74.

At step S74, the change-over controller 48, in accordance with the analysis result for the video switch command from the control unit 45, controls each related unit in the reception device 12 to start to prepare for receiving the distribution content of the change-over destination.

At step S75, the change-over controller 48 determines whether or not the time for content change-over arrives on the basis of the time for change-over indicated by Switching Time of the switch command. Then, if the time for content change-over arrives ("YES" in step S75) the process proceeds to step S76. Here, if Switching Time of the switch command is not set, the process at step S75 is skipped and the process proceeds to step S76.

At step S76, the change-over controller 48 controls each related unit in the reception device 12 to change over the content to that of the change-over destination. Here, for example, the change-over is carried out from the broadcast content to the preloaded distribution content to start to reproduce the distribution content.

Note that if determined that at step S72 the distribution content of the change-over destination is already preloaded, the processes at steps S73 and S74 are skipped. In addition, if determined that at step S73 the content change-over indicated by Switch ID is not set with the auto-switch in response to the preselect command received prior to the relevant switch command, steps S74 to S76 are skipped, and the content change-over is not carried out to end the switch command correspondent process.

On the other hand, if determined that at step S71 Auto Switch Flag of the switch command is not the auto-switch, that is, is the manual switch, the process proceeds to step S77. At step S77, the change-over controller 48, in accordance with the analysis result for the video switch command from the control unit 45, presents the question sentence described in Switching Message of the switch command to the user to prompt to select whether to change over the content.

When at step S77 the question sentence is presented, at step S78 the change-over controller 48 determines whether or not the content change-over is selected in response to the presented question sentence. If at step S78 the content change-over is selected, the process proceeds to step S74, and the processes of step S74 and subsequent steps described above are performed.

On the other hand, if at step S78 the content change-over is not selected or at step S79 the selection timeout lapses, the content change-over is not carried out to end the switch command correspondent process. Then, when the switch command correspondent process ends, the process returns to step S18 in FIG. 15, and this and subsequent processes are performed.

As described above, the switch command correspondent process is explained.

Enable Switch Command Correspondent Process

Figure 19:
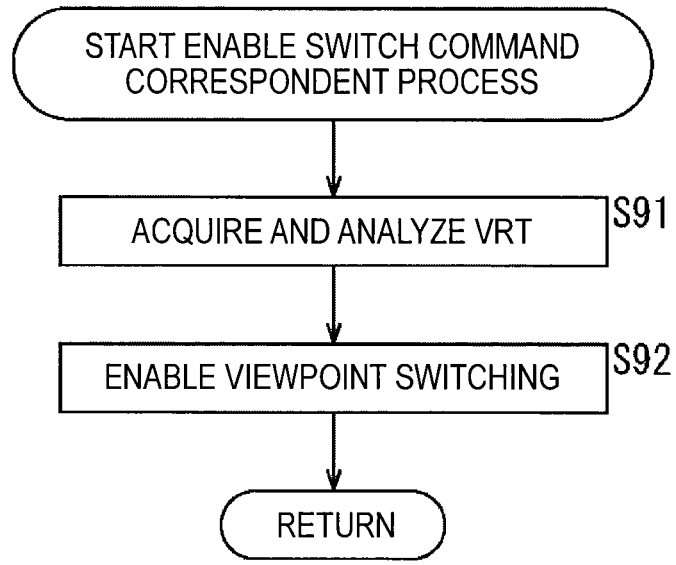
FIG. 19 is a flowchart illustrating an enable command correspondent process.

FIG. 19 is a flowchart illustrating a process in a case where the received video switch command is an enable switch command and corresponds to step S18 in FIG. 15 (hereinafter, referred to as enable switch command correspondent process).

At step S91, the change-over controller 48 controls each related unit in the reception device 12 to acquire and analyze the VRT on the basis of Switching Meta URL of the enable switch command. At step S92, the change-over controller 48 enables the viewpoint switching to present that the viewpoint is switchable to the user such as by displaying an arrow indicating a direction of viewpoint to be switchable on the display, for example. The enable switch command correspondent process ends here, the process returns to step S18 in FIG. 15, and this and subsequent processes are performed.

As described above, the enable switch command correspondent process is explained.

Disable Switch Command Correspondent Process

Figure 20:
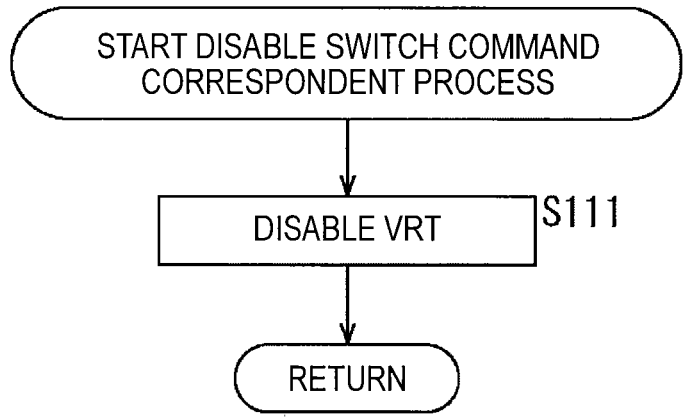
FIG. 20 is a flowchart illustrating a disable command correspondent process.

FIG. 20 is a flowchart illustrating a process in a case where the received video switch command is a disable switch command and corresponds to step S18 in FIG. 15 (hereinafter, referred to as disable switch command correspondent process).

At step S111, the change-over controller 48 disables the acquired VRT in response to the enable switch command. This makes the viewpoint switching impossible. The disable switch command correspondent process ends here, the process returns to step S18 in FIG. 15, and this and subsequent processes are performed.

As described above, the disable switch command correspondent process is explained.

The command correspondent processes corresponding to the ACR identification result described above allow the reception device 12 to extract the finger print information from the data of the received broadcast content, and acquire the identification result identified from the finger print information using the ACR technology. Then, the reception device 12 acquires the video switch command depending on the identification result for the broadcast content to control the operation of changing over from the broadcast content to the distribution content in response to the video switch command. This makes it possible to change over the content using the ACR technology. Particularly, the content change-over process using the ACR technology can be quickly carried out.

Note that the above explanation describes the change-over from the broadcast content to the distribution content, but, the change-over original content is not limited to the broadcast content, and further the change-over destination content is not limited to the distribution content. In other words, the video switch command is a command for controlling the operation of changing over between the first content in the change-over original and the second content in the change-over destination, and can be executed regardless of types of content as change-over targets. For example, the first content may be, besides the broadcast content, distribution content for streaming reproduction or download reproduction, NRT content acquired by way of NRT (non real time) broadcast and the like, for example. Additionally, the second content may be, besides the distribution content for streaming reproduction, the broadcast content, distribution content for download reproduction, NRT content and the like, for example.

In a case where the first content as the change-over original is distribution content for streaming reproduction or download reproduction, the finger print information is extracted from the video signal and audio signal of the distribution content and transmitted to the ACR server 13. Then, the ACR server 13 performs the ACR identification processing to here transmit as the identification result the content identification information, time position information, and command acquisition destination information. In other words, if the broadcast content is acquired from the broadcast device 11, the channel identification information is obtained as the identification result, and if the distribution content is acquired, the content identification information such as the content ID is obtained as the identification result. Then, the reception device 12 accesses the command server 14 corresponding to the URL described in the command acquisition destination information and transmits the content identification information and time position information to inquire the video switch command which is to be executable in the reception device 12. Then, the reception device 12 controls the content change-over operation in response to the video switch command from the command server 14.

For example, in a case where a content provider wants to insert a CM into the distribution content distributed in streaming via the Internet 16, a case can be assumed that since the application program such as a browser is already being operated often in the reception device 12, the application program cannot instruct the content change-over. The present technology directly changes over the content in response to the video switch command without using the application program, allowing the content change-over process to be quickly performed even in a case like this.

Configuration Example of Computer to which Present Technology is Applied

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 21 is a block diagram showing a hardware configuration example of a computer that performs the above-described series of processing using a program.

In the computer 100, a central processing unit (CPU) 101, a read only memory (ROM) 102 and a random access memory (RAM) 103 are mutually connected by a bus 104.

An input/output interface 105 is also connected to the bus 104. An input unit 106, an output unit 107, a recording unit 108, a communication unit 109, and a drive 110 are connected to the input/output interface 105.

The input unit 106 is configured from a keyboard, a mouse, a microphone or the like. The output unit 107 is configured from a display, a speaker or the like. The recording unit 108 is configured from a hard disk, a non-volatile memory or the like. The communication unit 109 is configured from a network interface or the like. The drive 110 drives a removable medium 111 such as a magnetic disk, an optical disk, a magneto-optical disk, a semiconductor memory or the like.

In the computer configured as described above, the CPU 101 loads a program that is recorded, for example, in the recording unit 108 onto the RAM 103 via the input/output interface 105 and the bus 104, and executes the program. Thus, the above-described series of processing is performed.

Programs to be executed by the computer 100 (the CPU 101) are provided being recorded in the removable medium 111 which is a packaged medium or the like. Also, programs may be provided via a wired or wireless transmission medium, such as a local area network, the Internet or digital satellite broadcasting.

In the computer 100, by inserting the removable medium 111 into the drive 110, the program can be installed in the recording unit 108 via the input/output interface 105. Further, the program can be received by the communication unit 109 via a wired or wireless transmission medium and installed in the recording unit 108. Moreover, the program can be installed in advance in the ROM 102 or the recording unit 108.

It should be noted that the program executed by a computer may be a program that is processed in time series according to the sequence described in this specification or a program that is processed in parallel or at necessary timing such as upon calling.

A processing step herein for describing a program which causes the computer to perform various processing does not necessarily have to be processed chronologically in the order described in a flow chart. It also includes processing performed in parallel or individually (for example, parallel processing or processing by an object).

The program may be a program executed by a single computer or may be a program executed in a distribution manner by a plurality of computers. The program may be transmitted remotely to a computer to be executed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)

A reception device including:

a reception part configured to receive first content;

a feature amount extraction part configured to extract a feature amount from data of the received first content;

an identification result acquisition part configured to acquire an identification result for the first content identified using the extracted feature amount;

a command acquisition part configured to acquire a command for controlling an operation of changing over between the first content and second content different from the first content depending on the acquired identification result; and a control part configured to control an operation of changing over from the first content to the second content in response to the acquired command.

(2)

The reception device according to (1), wherein the command is a first command for requesting a user to confirm whether or not a change-over is required to be carried out, prior to a timing of change-over from the first content to the second content, or a second command for changing over from the first content to the second content, and the control part requests the user to confirm whether or not the change-over is required to be carried out, in response to the first command, and in a case where the user permits the change-over to be carried out, the control part changes over from the first content to the second content in response to the second command.

(3)

The reception device according to (2), wherein the command is the first command, the second command, or a third command for causing the second content to be acquired prior to a timing of change-over from the first content to the second content, and in a case where the user permits the change-over to be carried out, the control part acquires the second content in response to the third command prior to a timing of change-over, and the control part changes over from the first content to the acquired second content in response to the second command.

(4)

The reception device according to (2) or (3), wherein the second command includes time information indicating a time to execute the second command, and the control part changes over from the first content to the second content when a timing of change-over arrives in accordance with the time information included in the second command.

(5)

The reception device according to (3) or (4), wherein the second command or the third command is settable for each user.

(6)

The reception device according to any of (1) to (5), wherein the command is a fourth command for setting a state in which it is possible to change to the second content that corresponds to a viewpoint designated by the user, or a fifth command for ending the state in which it is possible to change to the second content that corresponds to the viewpoint designated by the user, and the control part sets the state in which it is possible to change to the second content that corresponds to the viewpoint designated by the user in response to the fourth command, and the control part ends the state in which it is possible to change to the second content that corresponds to the viewpoint designated by the user in response to the fifth command.

(7)

The reception device according to any of (1) to (6), further including:

a buffer configured to sequentially store data of the received first content when the first content is changed over to the second content; and an output part configured to output the first content stored in the buffer while the second content is being output, when the second content is changed over to the first content.

(8)

The reception device according to any of (1) to (7), further including:

an output part configured to output the received first content when the second content is changed over to the first content.

(9)

The reception device according to any of (1) to (8), wherein the identification result acquisition part acquires the identification result for the first content identified using an ACR (Automatic Content Recognition) technology from the extracted feature amount.

(10)

The reception device according to any of (1) to (9), wherein the first content is broadcast content broadcasted via a broadcast network, and the second content is distribution content distributed from a distribution server via a communication network.

(11)

The reception device according to any of (1) to (10), wherein the feature amount extraction part extracts the feature amount from any one or both of a video signal and an audio signal of the first content.

(12)

A reception method in a reception device, the reception method including the steps of:

by the reception device receiving first content;

extracting a feature amount from data of the received first content;

acquiring an identification result for the first content identified using the extracted feature amount;

acquiring a command for controlling an operation of changing over between the first content and second content different from the first content depending on the acquired identification result; and controlling an operation of changing over from the first content to the second content in response to the acquired command.

(13)
A program causing a computer to function as:
a reception part configured to receive first content;
a feature amount extraction part configured to extract a feature amount from data of the received first content;
an identification result acquisition part configured to acquire an identification result for the first content identified using the extracted feature amount;
a command acquisition part configured to acquire a command for controlling an operation of changing over between the first content and second content different from the first content depending on the acquired identification result; and
a control part configured to control an operation of changing over from the first content to the second content in response to the acquired command.

(14)
An information processing system including:
a reception device;
a first information processing device;
a second information processing device; and
a third information processing device, wherein
the reception device includes
a reception part configured to receive a first content,
a feature amount extraction part configured to extract a feature amount from data of the received first content,
an identification result acquisition part configured to transmit the extracted feature amount to the first information processing device, and to acquire an identification result for the first content which is identified using the feature amount in the first information processing device,
a command acquisition part configured to transmit the identification result acquired from the first information processing device to the second information processing device, and to acquire from the second information processing device a command for controlling an operation of changing over between the first content and second content distributed from the third information processing device, and
a control part configured to control an operation of changing over from the first content to the second content distributed from the third information processing device in response to the command acquired from the second information processing device,
the first information processing device includes
a first provision part configured to provide the identification result obtained by identifying the first content using the feature amount in response to an inquiry from the reception device,
the second information processing device includes
a second provision part configured to provide the command corresponding to the identification result in response to an inquiry from the reception device,
the third information processing device includes
a distribution part configured to distribute the second content in response to an inquiry from the reception device.

REFERENCE SIGNS LIST 1 broadcast system
11 broadcast device
12 reception device
13 ACR server
14 command server
15 distribution server
16 Internet
31 tuner
33 retention buffer
34 retention controller
42 finger print extraction unit
43 communication I/F
44 command analysis unit
45 control unit
48 change-over controller
100 computer,
101 CPU

The invention claimed is:

1. A reception device comprising:
circuitry configured to
receive first content including finger print information embedded within a video signal or an audio signal of the first content,
extract the finger print information from within the video signal or from within the audio signal of the first content,
acquire an identification result for the first content identified using the extracted finger print information,
acquire a command for controlling an operation of changing over between the first content and second content different from the first content depending on the acquired identification result, the second content corresponding to a designated viewpoint,
control an operation of changing over from the first content to the second content in response to the acquired command, and
during the operation of changing over, reproduce the second content at a viewing sequence in time based on an operation mode of the reception device, wherein
the operation mode of the reception device includes a retention mode and a pass-through mode, in the retention mode, a retention buffer sequentially stores data of a transport stream (TS) supplied from a demultiplexer and the data is sequentially read out from the retention buffer, and in the pass-through mode, the TS data is supplied from the demultiplexer as is without any retention operation in the retention buffer, and
the viewing sequence in time in the pass-through mode is different from the viewing sequence in time in the retention mode.

2. The reception device according to claim 1, wherein
the command is a first command for requesting a confirmation whether or not a change-over is required to be carried out, prior to a timing of the change-over from the first content to the second content, or a second command for changing over from the first content to the second content, and
the circuitry is further configured to
request the confirmation of whether or not the change-over is required to be carried out, in response to the first command, and
in a case where the change-over to be carried out is permitted via the confirmation, the change-over is performed from the first content to the second content in response to the second command.

3. The reception device according to claim 2, wherein
the command is the first command, the second command, or a third command for causing the second content to be acquired prior to the timing of the change-over from the first content to the second content, and in the case where the change-over to be carried out is permitted via the confirmation, the circuitry is further configured to acquire the second content in response to the third command prior to the timing of change-over, and change over from the first content to the acquired second content in response to the second command.

4. The reception device according to claim 3, wherein the second command includes time information indicating a time to execute the second command, and the circuitry is further configured to change over from the first content to the second content when the timing of change-over arrives in accordance with the time information included in the second command.

5. The reception device according to claim 3, wherein the second command or the third command is settable for different users.

6. The reception device according to claim 3, wherein the command is a fourth command for setting a state in which it is possible to change to the second content that corresponds to the designated viewpoint, or a fifth command for ending the state in which it is possible to change to the second content that corresponds to the designated viewpoint, and the circuitry is further configured to set the state in which it is possible to change to the second content that corresponds to the designated viewpoint in response to the fourth command, or end the state in which it is possible to change to the second content that corresponds to the designated viewpoint in response to the fifth command.

7. The reception device according to claim 1, wherein the circuitry is further configured to:

sequentially store data of the received first content in the retention buffer when the first content is changed over to the second content, and in response to the second content being changed over to the first content, output the stored first content, stored for a duration of time during which the second content was output.

8. The reception device according to claim 1, wherein the circuitry is further configured to:

output the received first content when the second content is changed over to the first content.

9. The reception device according to claim 1, wherein the circuitry is further configured to acquire the identification result for the first content identified using an ACR (Automatic Content Recognition) technology from the extracted finger print information.

10. The reception device according to claim 1, wherein the first content is broadcast content broadcasted via a broadcast network, and the second content is distribution content distributed from a distribution server via a communication network.

11. The reception device according to claim 1, wherein the circuitry is further configured to:

periodically, at a time interval, extract the finger print information from the video signal and the audio signal of the broadcast content, and transmit the finger print information to an ACR (Automatic Content Recognition) server to identify broadcast content.

12. The reception device according to claim 1, wherein: the operation mode of the reception device is a retention mode, and during the retention mode, the viewing sequence in time is a sequence in the second content that has been retained since a previous operation of changing over.

13. The reception device according to claim 1, wherein: the operation mode of the reception device is a retention mode, and during the retention mode, the viewing sequence in time is a sequence in the second content that has been retained after a previous operation of changing over.

14. The reception device according to claim 1, wherein: the identification result includes a preload command received before the command for controlling the operation of changing over, and upon receiving the preload command, the reception device begins to acquire the second content before changing over to the second content.

15. The reception device according to claim 14, wherein the second content is preloaded second content.

16. The reception device according to claim 1, wherein the reception device is a digital television receiver.

17. A reception method in a reception device, the reception method comprising:

by the reception device receiving first content including finger print information embedded within a video signal or an audio signal of the first content;

extracting the finger print information from within the video signal or from within the audio signal of the first content;

acquiring an identification result for the first content identified using the extracted finger print information;

acquiring a command for controlling an operation of changing over between the first content and second content different from the first content depending on the acquired identification result, the second content corresponding to a designated viewpoint;

controlling an operation of changing over from the first content to the second content in response to the acquired command; and during the operation of changing over, reproducing the second content at a viewing sequence in time based on an operation mode of the reception device, the operation mode of the reception device including a retention mode and a pass-through mode, in the retention mode, a retention buffer sequentially stores data of a transport stream (TS) supplied from a demultiplexer and the data is sequentially read out from the retention buffer, and in the pass-through mode, the TS data is supplied from the demultiplexer as is without any retention operation in the retention buffer, and the viewing sequence in time in the pass-through mode is different from the viewing sequence in time in the retention mode.

18. The method device according to claim 17, wherein the command is a first command for requesting a confirmation whether or not a change-over is required to be carried out, prior to a timing of the change-over from the first content to the second content, or a second command for changing over from the first content to the second content, and the method further comprises requesting the confirmation of whether or not the change-over is required to be carried out, in response to the first command, and in a case where the change-over to be carried out is permitted via the confirmation, performing the change-over from the first content to the second content in response to the second command.

19. The reception method according to claim 18, wherein the command is the first command, the second command, or a third command for causing the second content to be acquired prior to the timing of the change-over from the first content to the second content, and in the case where the change-over to be carried out is permitted via the confirmation, the method further comprises acquiring the second content in response to the third command prior to the timing of change-over, and changing over from the first content to the acquired second content in response to the second command.

20. The reception method according to claim 17, further comprising:

sequentially storing data of the received first content in the retention buffer when the first content is changed over to the second content, and in response to the second content being changed over to the first content, outputting the stored first content, stored for a duration of time during which the second content was output.

21. The reception method according to claim 17, further comprising:

outputting the received first content when the second content is changed over to the first content.

22. The reception method according to claim 17, further comprising:

acquiring the identification result for the first content identified using an ACR (Automatic Content Recognition) technology from the extracted finger print information.

23. The reception method according to claim 17, wherein the first content is broadcast content broadcasted via a broadcast network, and the second content is distribution content distributed from a distribution server via a communication network.

24. The reception method according to claim 17, wherein:

the identification result includes a preload command received before the command for controlling the operation of changing over, and upon receiving the preload command, the reception device begins to acquire the second content before changing over to the second content.

25. A non-transitory computer-readable storage medium having embedded therein instructions, which when executed by a computer cause the computer to perform a method comprising:

receiving first content including finger print information embedded within a video signal or an audio signal of the first content;

extracting the finger print information from within the video signal or from within the audio signal of the first content;

acquiring an identification result for the first content identified using the extracted finger print information;

acquiring a command for controlling an operation of changing over between the first content and second content different from the first content depending on the acquired identification result, the second content corresponding to a designated viewpoint;

controlling an operation of changing over from the first content to the second content in response to the acquired command; and during the operation of changing over, reproducing the second content at a viewing sequence in time based on an operation mode of the reception device, the operation mode of the reception device including a retention mode and a pass-through mode, in the retention mode, a retention buffer sequentially stores data of a transport stream (TS) supplied from a demultiplexer and the data is sequentially read out from the retention buffer, and in the pass-through mode, the TS data is supplied from the demultiplexer as is without any retention operation in the retention buffer, and the viewing sequence in time in the pass-through mode is different from the viewing sequence in time in the retention mode.

26. An information processing system comprising:

a reception device;

a first information processing device;

a second information processing device; and a third information processing device, wherein the reception device includes circuitry configured to receive first content including finger print information embedded within a video signal or an audio signal of the first content, extract the finger print information from within the video signal or from within the audio signal of the first content, transmit the extracted finger print information to the first information processing device, and to acquire an identification result for the first content which is identified using the finger print information in the first information processing device, transmit the identification result acquired from the first information processing device to the second information processing device, and to acquire from the second information processing device a command for controlling an operation of changing over between the first content and second content distributed from the third information processing device, the second content corresponding to a designated viewpoint, control an operation of changing over from the first content to the second content distributed from the third information processing device in response to the command acquired from the second information processing device, and during the operation of changing over, reproduce the second content at a viewing sequence in time based on an operation mode of the reception device, the first information processing device includes circuitry configured to provide the identification result obtained by identifying the first content using the finger print information in response to an inquiry from the reception device, the second information processing device includes circuitry configured to provide the command corresponding to the identification result in response to an inquiry from the reception device, and the third information processing device includes circuitry configured to distribute the second content in response to an inquiry from the reception device, wherein the operation mode of the reception device includes a retention mode and a pass-through mode, in the retention mode, a retention buffer sequentially stores data of a transport stream (TS) supplied from a demultiplexer and the data is sequentially read out from the retention buffer, and in the pass-through mode, the TS data is supplied from the demultiplexer as is without any retention operation in the retention buffer, and the viewing sequence in time in the pass-through mode is different from the viewing sequence in time in the retention mode.

\* \* \* \* \*